US012627791B2

(12) United States Patent
Piao et al.

(10) Patent No.: US 12,627,791 B2
(45) Date of Patent: **\*May 12, 2026**

(54) VIDEO ENCODING AND DECODING METHOD FOR PREDICTING CHROMA COMPONENT, AND VIDEO ENCODING AND DECODING DEVICE FOR PREDICTING CHROMA COMPONENT

(71) Applicant: SAMSUNG ELECTRONICS CO., LTD., Suwon-si (KR)

(72) Inventors: Yinji Piao, Suwon-si (KR); Anish Tamse, Suwon-si (KR); Minsoo Park, Suwon-si (KR); Minwoo Park, Suwon-si (KR); Seungsoo Jeong, Suwon-si (KR); Kiho Choi, Suwon-si (KR); Narae Choi, Suwon-si (KR); Woongil Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,107

(22) Filed: May 24, 2024

(65) Prior Publication Data

US 2024/0314294 A1 Sep. 19, 2024

Related U.S. Application Data

(63) Continuation of application No. 17/434,684, filed as application No. PCT/KR2020/002929 on Feb. 28, 2020, now Pat. No. 12,022,060.

(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/196* (2014.11)

(58) Field of Classification Search
CPC .............. H04N 19/105; H04N 19/132; H04N 19/159; H04N 19/176; H04N 19/196
See application file for complete search history.

(56) References Cited

U.S. PATENT DOCUMENTS

| | | | |
|---|---|---|---|
| 8,260,069 B2 | 9/2012 | Kim et al. | |
| 2006/0146191 A1 | 7/2006 | Kim et al. | |

(Continued)

FOREIGN PATENT DOCUMENTS

| | | |
|---|---|---|
| CN | 107257456 A | 10/2017 |
| CN | 108712649 A | 10/2018 |

(Continued)

OTHER PUBLICATIONS

Helmrich et al., "CE7-related: Joint chroma residual coding with multiple modes", Joint Video Experts Team (JVET) of ITU-T SG 16 WP 3 and ISO/IEC JTC 1/SC 29/WG 11, JVET-N0282-v3, Mar. 2019, Total 10 pages.

(Continued)

*Primary Examiner* — Jonathan R Messmore
(74) *Attorney, Agent, or Firm* — Sughrue Mion, PLLC

(57) ABSTRACT

Proposed is a video decoding method including: determining a weight of a residual sample of a Cr component and a weight of a residual sample of a Cb component, based on a prediction type of a coding unit, cbf information for the Cr component, and cbf information of the Cb component, obtaining a chroma joint residual sample of a current block from a bitstream, reconstructing the residual sample of the Cr component by using the chroma joint residual sample of the current block and the weight of the residual sample of the (Continued)

Cr component, and reconstructing the residual sample of the Cb component by using the chroma joint residual sample of the current block and the weight of the residual sample of the Cb component.

3 Claims, 24 Drawing Sheets

Related U.S. Application Data

(60) Provisional application No. 62/840,003, filed on Apr. 29, 2019, provisional application No. 62/811,672, filed on Feb. 28, 2019.

(51) Int. Cl.

| *H04N 19/159* | (2014.01) |
| *H04N 19/176* | (2014.01) |
| *H04N 19/196* | (2014.01) |

(56) References Cited

U.S. PATENT DOCUMENTS

| 2007/0200737 | A1 | 8/2007 | Gao et al. | |
| 2013/0107970 | A1 | 5/2013 | Wang et al. | |
| 2013/0266074 | A1 | 10/2013 | Guo et al. | |
| 2015/0030067 | A1 | 1/2015 | Zhao et al. | |
| 2015/0172658 | A1 | 6/2015 | Kim et al. | |
| 2016/0165253 | A1 | 6/2016 | Lee et al. | |
| 2017/0272759 | A1 | 9/2017 | Seregin et al. | |
| 2017/0295380 | A1 | 10/2017 | Huang et al. | |
| 2018/0249162 | A1 | 8/2018 | Lim et al. | |
| 2018/0288437 | A1* | 10/2018 | Hsiang | H04N 19/60 |
| 2018/0324417 | A1 | 11/2018 | Karczewicz et al. | |
| 2019/0306511 | A1 | 10/2019 | Jang et al. | |
| 2020/0288173 | A1* | 9/2020 | Ye | H04N 19/176 |
| 2020/0382788 | A1 | 12/2020 | Kim et al. | |
| 2021/0235077 | A1 | 7/2021 | Kim et al. | |
| 2021/0337202 | A1* | 10/2021 | Xiu | H04N 19/186 |
| 2023/0291898 | A1* | 9/2023 | Zhu | H04N 19/80 |

FOREIGN PATENT DOCUMENTS

| CN | 108712650 | A | 10/2018 |
| CN | 109076221 | A | 12/2018 |
| KR | 10-1138392 | B1 | 4/2012 |
| KR | 10-2014-0004006 | A | 1/2014 |
| KR | 10-1601840 | B1 | 3/2016 |
| KR | 10-2016-0048748 | A | 5/2016 |
| KR | 10-2018-0098159 | A | 9/2018 |
| KR | 10-2018-0136555 | A | 12/2018 |
| KR | 10-2019-0009408 | A | 1/2019 |
| WO | 2012/138032 | A1 | 10/2012 |

OTHER PUBLICATIONS

Ray et al., "CE7-related: Alternative joint coding of chroma residuals", Joint Video Experts Team (JVET) of ITU-T SG 16 WP 3 and ISO/IEC JTC 1/SC 29/WG 11, Jul. 2019, XP030220217, (4 pages total).

Van der Auwera et al., "CE7-related: Joint coding of chroma residuals", Joint Video Experts Team (JVET) of ITU-T SG 16 WP 3 and ISO/IEC JTC 1/SC 29/WG 11, JVET-N0347-v3, Mar. 2019, Total 11 pages.

Lainema, "CE7-related: Joint coding of chrominance residuals", Joint Video Experts Team (JVET) of ITU-T SG 16 WP 3 and ISO/IEC JTC 1/SC 29/WG 11, Jan. 2019, XP030202337, (5 total pages).

Communication dated Jun. 11, 2020, issued by the International Searching Authority in counterpart International Application No. PCT/KR2020/002929 (PCT/ISA/220, 210, 237).

Communication issued Oct. 31, 2022 by the European Patent Office in counterpart European Application No. 20762119.4.

Communication issued Oct. 27, 2023 by the Intellectual Property India for Indian Patent Application No. 202127043667.

Communication issued Aug. 8, 2022 by the Korean Patent Office in counterpart Korean Application No. 10-2021-7016261.

Office Action dated Apr. 11, 2024, issued by Chinese Patent Office in Chinese Patent Application No. 202080017377.1.

Notice of Allowance issued on Sep. 27, 2024 by the Chinese Patent Office in corresponding CN Patent Application No. 202080017377.1.

Communication issued Jun. 13, 2025 by the European Patent Office in European Patent Application No. 20762119.4.

Communication issued Aug. 19, 2025 by the Japan Patent Office in Japanese Patent Application No. 2024-229570.

Iwamura, Shunsuke et al., "[AHG15] On scaling list for JCCR", Joint Video Experts Team (JVET) of ITU-T SG 16 WP 3 and ISO/IEC JTC 1/SC 29/WG 11, 16th Meeting: Geneva, CH, Oct. 1, 2019, Document: JVET-P0608r1. (12 pages total).

Bross, Benjamin et al., "Versatile Video Coding (Draft 8)", Joint Video Experts Team (JVET) of ITU-T SG16 WP 3 and ISO/IEC JTC 1/SC 29/WG 11, 17th Meeting: Brussels, BE, Jan. 7, 2020, Document: JVETQ2001-v7. (15 pages total).

Chen, Jianle et al., "Algorithm description for Versatile Video Coding and Test Model 8 (VTM 8)", Joint Video Experts Team (JVET) of ITU-T SG 16 WP 3 and ISO/IEC JTC 1/SC 29/WG 11, 17th Meeting: Brussels, BE, Jan. 7, 2020, Document: JVET-Q2002-v1. (11 pages total).

Anonymous, "Series H: Audiovisual and Multimedia Systems Infrastructure of audiovisual services—Coding of moving video", High efficiency video coding, International Telecommunication Union, Feb. 2018, 10 total pages.

Anonymous, "Special Feature 1: The 10 Fundamental Basics of Programming—Part 1: Computers Operate Using Just Three Types of Calculations", Nikkei Software, Jun. 24, 2008, 9 total pages, vol. 11, ISSN: 1347-4685.

Office Action dated Jan. 20, 2026, issued by Japanese Patent Office in Japanese Patent Application No. 2024-229570.

\* cited by examiner

FIG. 4
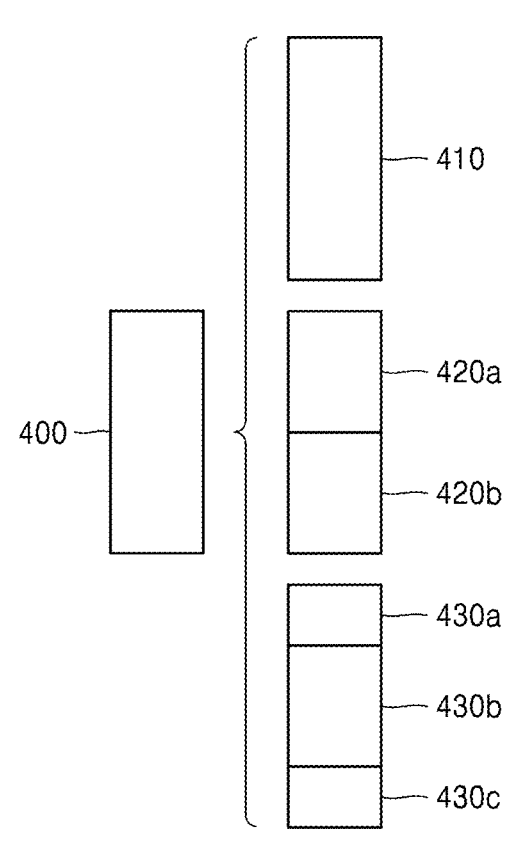
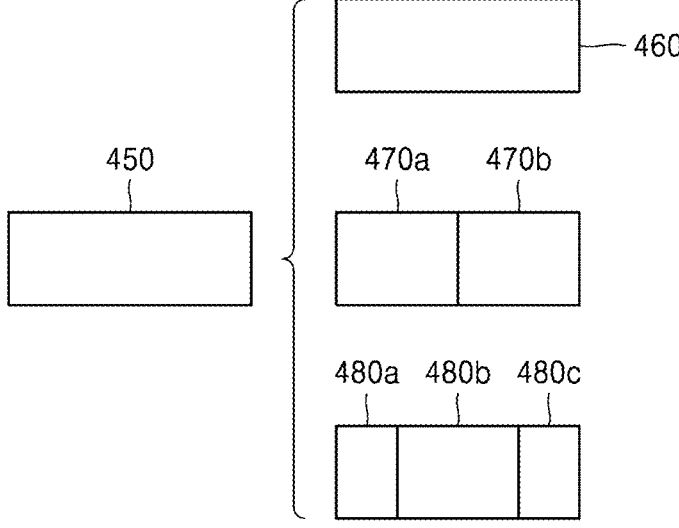

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

2201 — Cb = jointCb

2202 — Cr = jointCb * weightTable(corridx)

| transform_unit( x0, y0, tbWidth, tbHeight, treeType, subTuIndex, chType ) { |
|---|
|    if( IntraSubPartitionsSplitType != ISP_NO_SPLIT  &&<br>      treeType = = SINGLE_TREE  &&  subTuIndex = = NumIntraSubPartitions − 1 ) { |
|    ... |
|        tu_cbf_cb [ xC ] [ yC ] |
|        tu_cbf_Cr [ xC ] [ yC ] |
|      } |
|    } |
|    ... |
|    if( sps_joint_cbCr_enabled_flag  &&  ( ( CuPredMode[ chType ] [ x0 ] [ y0 ] = =<br>MODE_INTRA  &&  ( tu_cbf_cb[ xC ] [ yC ]  \| \|  tu_cbf_Cr[ xC ] [ yC ] ) )  \| \|<br>    ( tu_cbf_cb[ xC ] [ yC ]  &&  tu_cbf_Cr[ xC ] [ yC ] ) )  &&  chromaAvailable ) |
|     tu_joint_cbCr_residual_flag[ xC ] [ yC ] |
|    ... |
|    } |
| } |

FIG. 24

| tu_CBF_cb | tu_CBF_Cr | RECONSTRUCTED VALUES OF Cb AND Cr RESIDUALS | MODE INDEX |
|:---:|:---:|:---|:---:|
| 1 | 0 | resCb[x][y] = resJointC[x][y]<br>resCr[x][y] = (CSign * resJointC[x][y])>>1 | 0 |
| 1 | 1 | resCb[x][y] = resJointC[x][y]<br>resCr[x][y] = CSign * resJointC[x][y] | 2 |
| 0 | 1 | resCb[x][y] = (CSign * resJointC[x][y])>>1<br>resCr[x][y] = resJointC[x][y] | 3 |

VIDEO ENCODING AND DECODING METHOD FOR PREDICTING CHROMA COMPONENT, AND VIDEO ENCODING AND DECODING DEVICE FOR PREDICTING CHROMA COMPONENT

CROSS-REFERENCE TO RELATED APPLICATIONS

This is a Continuation of U.S. application Ser. No. 17/434,684 filed Aug. 27, 2021, which is a Continuation Application of International Application PCT/KR2020/002929 filed on Feb. 28, 2020, which claims benefit of U.S. Provisional Patent Application No. 62/811,672 filed on Feb. 28, 2019, U.S. Provisional Patent Application No. 62/840,003 filed on Apr. 29, 2019, the disclosures of which are incorporated herein in their entireties by reference.

BACKGROUND

1. Field

The disclosure relates to an image encoding and decoding field. More specifically, the disclosure relates to a video encoding and decoding method and device for predicting a chroma component.

2. Description of Related Art

Video with high image quality may use a large amount of data upon being decoded. However, because a bandwidth allowed to transfer video data is limited, a data rate applied for transferring video data may be limited. Therefore, to efficiently transmit video data, there is a need for a video data encoding and decoding method for increasing a compression rate while minimizing degradation of image quality.

Video data is compressed by removing spatial redundancy and temporal redundancy between pixels. Because adjacent pixels generally have common features, coding information is transmitted in a data unit configured with pixels to remove redundancy between the adjacent pixels.

Instead of directly transmitting pixel values of pixels included in a data unit, a method for obtaining the pixel values is transmitted. A prediction method for predicting a pixel value as a value similar to its original value is determined for each data unit, and coding information about the prediction method is transmitted from an encoder to a decoder. Also, because the predicted value is not completely identical to the original value, residual data about a difference between the original value and the prediction value is transmitted from the encoder to the decoder.

Accurate prediction increases coding information required to specify a prediction method, but decreases a size of residual data. Accordingly, a prediction method is determined in consideration of sizes of coding information and residual data. Particularly, data units split from a picture have various sizes, and a larger size of a data unit results in higher probability that the accuracy of prediction will be reduced, while more reducing coding information. Accordingly, a size of a block is determined according to a feature of a picture.

Also, prediction methods include intra prediction and inter prediction. The intra prediction is a method of predicting pixels of a block from pixels neighboring the block. The inter prediction is a method of predicting pixels by referring to pixels of another picture referred to by a picture including a block. Accordingly, spatial redundancy is removed by intra prediction, and temporal redundancy is removed by inter prediction.

As the number of prediction methods increases, an amount of coding information for representing the prediction methods increases. Accordingly, by predicting coding information that is applied to a block from another block, a size of coding information can be reduced.

Because loss of video data is allowed within a range that cannot be recognized by the human eye, lossy compression is performed according to a process of converting and quantizing residual data, thereby reducing an amount of residual data.

SUMMARY

Provided are video encoding method, the video decoding method, the video encoding device, and the video decoding device for predicting the chroma component which may efficiently encode and decode chroma components, for example, a Cr component and a Cb component of a picture, according to an embodiment.

Additional aspects will be set forth in part in the description which follows and, in part, will be apparent from the description, or may be learned by practice of the presented embodiments.

According to an aspect of the disclosure, a video decoding method includes obtaining, from a bitstream, information indicating a prediction type of a coding unit including a current block; obtaining, from the bitstream, coded block flag (CBF) information for a Cr component of the current block and CBF information for a Cb component of the current block; determining a weight of a residual sample of the Cr component and a weight of a residual sample of the Cb component, based on the prediction type of the coding unit, the CBF information for the Cr component, and the CBF information for the Cb component; obtaining, from the bitstream, a chroma joint residual sample of the current block; and reconstructing the residual sample of the Cr component by using the chroma joint residual sample of the current block and the weight of the residual sample of the Cr component, and reconstructing the residual sample of the Cb component by using the chroma joint residual sample of the current block and the weight of the residual sample of the Cb component.

The determining of the weight of the residual sample of the Cr component and the weight of the residual sample of the Cb component may include: obtaining chroma joint information indicating whether a chroma sample is encoded to represent the residual sample of the Cb component and the residual sample of the Cr component, which corresponds to the residual sample of the Cb component in the current block, based on the prediction type of the coding unit, the CBF information for the Cr component, and the CBF information for the Cb component; and based on the chroma joint information indicating that the chroma sample is encoded in the current block, determining the weight of the residual sample of the Cr component and the weight of the residual sample of the Cb component, based on the prediction type of the coding unit, the CBF information for the Cr component, and the CBF information for the Cb component.

The weight of the residual sample of the Cr component may be $-\frac{1}{2}$, and the weight of the residual sample of the Cb component may be 1.

The weight of the residual sample of the Cr component may be $-1$, and the weight of the residual sample of the Cb component may be 1.

The weight of the residual sample of the Cr component may be 1, and the weight of the residual sample of the Cb component may be −½.

The determining of the weight of the residual sample of the Cr component and the weight of the residual sample of the Cb component may include setting a number of joint modes corresponding to combinations of weights of the residual sample of the Cr component and weights of the residual sample of the Cb component based on whether the prediction type of the coding unit is an intra prediction mode or an inter prediction mode.

The determining of the weight of the residual sample of the Cr component and the weight of the residual sample of the Cb component may further include: selecting, based on the prediction type of the coding unit being the intra prediction mode, a selected joint mode which is selected from among the joint modes based on the CBF information for the Cr component and the CBF information for the Cb component; and determining the weight of the residual sample of the Cr component and the weight of the residual sample of the Cb component according to the selected joint mode.

The determining of the weight of the residual sample of the Cr component and the weight of the residual sample of the Cb component may further include determining the weight of the residual sample of the Cr component and the weight of the residual sample of the Cb component according to an allowed joint mode based on the prediction type of the coding unit is the inter prediction mode.

The video decoding method method may further include determining a joint mode including the weight of the residual sample of the Cr component and the weight of the residual sample of the Cb component, based on the chroma joint information, the CBF information for the Cr component, and the CBF information for the Cb component; and determining a quantization parameter for the current block, based on the determined joint mode.

According to an aspect of the disclosure, a video decoding device includes an obtainer configured to: obtain, from a bitstream, information indicating a prediction type of a coding unit including a current block, obtain, from the bitstream, coded block flag (CBF) information for a Cr component of the current block and CBF information for a Cb component of the current block, and obtain, from the bitstream, a chroma joint residual sample of the current block; and a decoder configured to: determine a weight of a residual sample of the Cr component and a weight of a residual sample of the Cb component, based on the prediction type of the coding unit, the CBF information for the Cr component, and the CBF information for the Cb component, reconstruct the residual sample of the Cr component by using the chroma joint residual sample of the current block and the weight of the residual sample of the Cr component, and reconstruct the residual sample of the Cb component by using the chroma joint residual sample of the current block and the weight of the residual sample of the Cb component.

The obtainer may be further configured to obtain, from the bitstream, chroma joint information representing whether a chroma sample is encoded to represent the residual sample of the Cb component and the residual sample of the Cr component, which corresponds to the residual sample of the Cb component in the current block, based on the prediction type of the coding unit, the CBF information for the Cr component, and the CBF information for the Cb component, and the decoder may be further configured to: determine, when the chroma joint information represents that the chroma sample is encoded, the weight of the residual sample of the Cr component and the weight of the residual sample of the Cb component, based on the prediction type of the coding unit, the CBF information for the Cr component, and the CBF information for the Cb component, and set a number of joint modes corresponding to combinations of weights of the residual sample of the Cr component and weights of the residual sample of the Cb component, based on whether the prediction type of the coding unit is an intra prediction mode or an inter prediction mode.

The decoder may be further configured to: based on the prediction type of the coding unit being the intra prediction mode, select a selected joint mode from among the joint modes based on the CBF information for the Cr component and the CBF information for the Cb component, and determine the weight of the residual sample of the Cr component and the weight of the residual sample of the Cb component according to the selected joint mode, and based on the prediction type of the coding unit being the inter prediction mode, determine the weight of the residual sample of the Cr component and the weight of the residual sample of the Cb component according to an allowed joint mode when.

According to an aspect of the disclosure, a video encoding method includes determining a prediction type of a coding unit including a current block; determining coded block flag (CBF) information for a Cr component of the current block and CBF information for a Cb component of the current block; determining a weight of a residual sample of the Cr component and a weight of a residual sample of the Cb component, based on the prediction type of the coding unit, the CBF information for the Cr component, and the CBF information for the Cb component; and generating a chroma joint residual sample of the current block, wherein the residual sample of the Cr component is reconstructed by using the chroma joint residual sample of the current block and the weight of the residual sample of the Cr component, and the residual sample of the Cb component is reconstructed by using the chroma joint residual sample of the current block and the weight of the residual sample of the Cb component.

The video encoding method method may further include generating chroma joint information representing whether a chroma sample is encoded to represent the residual sample of the Cb component and the residual sample of the Cr component, which corresponds to the residual sample of the Cb component in the current block, wherein, based on the chroma sample being encoded in the current block, the weight of the residual sample of the Cr component and the weight of the residual sample of the Cb component are determined based on the prediction type of the coding unit, the CBF information for the Cr component, and the CBF information for the Cb component, and wherein a number of joint modes corresponding to combinations of weights of the residual sample of the Cr component and weights of the residual sample of the Cb component is set based on whether the prediction type of the coding unit is an intra prediction mode or an inter prediction mode.

The determining of the weight of the residual sample of the Cr component and the weight of the residual sample of the Cb component may include: based on the prediction type of the coding unit being the intra prediction mode, selecting a selected joint mode from among the joint modes based on the CBF information for the Cr component and the CBF information for the Cb component, and determining the weight of the residual sample of the Cr component and the weight of the residual sample of the Cb component according to the selected joint mode; and based on the prediction type of the coding unit being the inter prediction mode, determining the weight of the residual sample of the Cr component and the weight of the residual sample of the Cb component according to an allowed joint mode.

According to an aspect of the disclosure, a video decoding method includes obtaining, from a bitstream, a chroma joint residual sample of a current block; obtaining, from the bitstream, first information for reconstructing a first residual sample of a first component from among a Cr component of the current block and a Cb component of the current block; reconstructing the first residual sample based on the chroma joint residual sample and the first information; and reconstructing a second residual sample of a second component from among the Cr component of the current block and the Cb component of the current block based on the chroma joint residual sample and the reconstructed first residual sample.

The first information may include a difference joint chroma residual sample.

The first residual sample may be equal to the chroma joint residual sample.

Accordingly, a video encoding method, a video decoding method, a video encoding device, and a video decoding device for predicting a chroma component, according to an embodiment, provide a method of effectively encoding and decoding a chroma component by using similarity between a Cb component and a Cr component for predicting the chroma component.

However, effects that can be achieved by the video encoding method, the video decoding method, the video encoding device, and the video decoding device for predicting the chroma component, according to an embodiment, are not limited to those described above, and other effects not described above will be clearly understood by one of ordinary skill in the technical art to which the disclosure belongs from the following descriptions.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates a process, performed by an image decoding device, of determining at least one coding unit by splitting a non-square coding unit, according to an embodiment.

FIG. 10 illustrates that a shape into which a second coding unit is splittable is restricted when the second coding unit of a non-square shape, which is determined when an image decoding device splits a first coding unit, satisfies a predetermined condition, according to an embodiment.

FIG. 13 illustrates a process of determining a depth of a coding unit when a shape and size of the coding unit change, when the coding unit is recursively split such that a plurality of coding units are determined, according to an embodiment.

FIG. 14 illustrates depths that are determinable based on shapes and sizes of coding units, and part indices (PIDs) that are for distinguishing between the coding units, according to an embodiment.

FIG. 22 represents relations between a Cb component, a Cr component, and a chroma coding component, according to an embodiment.

FIG. 23 illustrates transform unit syntax according to an embodiment.

FIG. 24 represents relations between Cb components, Cr components, and chroma coding components with respect to combinations of Cb CBF values and Cr CBF, according to an embodiment.

DETAILED DESCRIPTION

Figure 1:
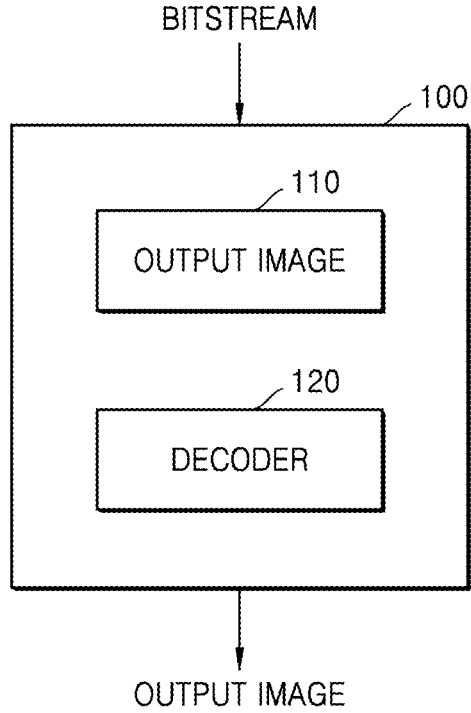
FIG. 1 is a schematic block diagram of an image decoding device according to an embodiment.
Figure 2:
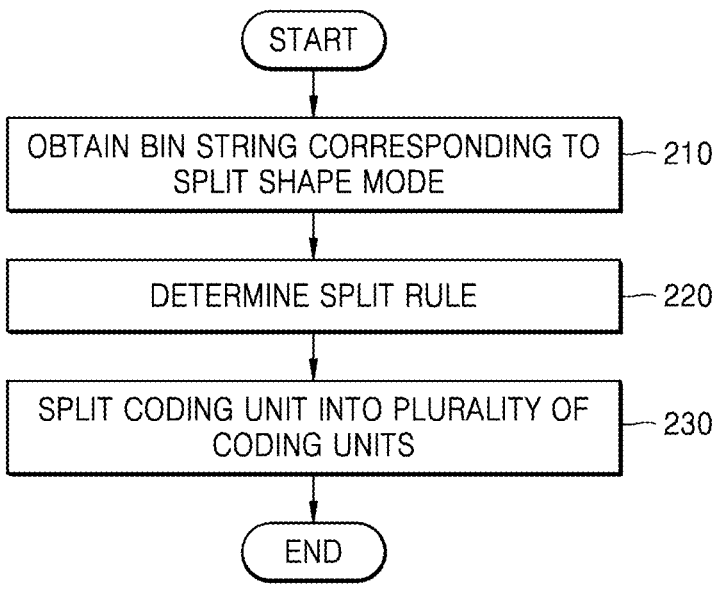
FIG. 2 is a flowchart of an image decoding method according to an embodiment.

A method of decoding motion information, according to an embodiment provided in the disclosure, includes: obtaining, from a bitstream, information representing a prediction type of a coding unit including a current block; obtaining, from the bitstream, cbf information for a Cr component of the current block and cbf information for a Cb component of the current block; determining a weight of a residual sample of the Cr component and a weight of a residual sample of the Cb component, based on the prediction type of the coding unit, the cbf information for the Cr component, and the cbf information for the Cb component; obtaining, from the bitstream, a chroma joint residual sample of the current block; and reconstructing the residual sample of the Cr component by using the chroma joint residual sample of the current block and the weight of the residual sample of the Cr component, and reconstructing the residual sample of the Cb component by using the chroma joint residual sample of the current block and the weight of the residual sample of the Cb component.

According to an embodiment, the determining of the weight of the residual sample of the Cr component and the weight of the residual sample of the Cb component may include: obtaining chroma joint information representing whether a chroma sample is encoded to represent the residual sample of the Cb component and the residual sample of the Cr component, corresponding to the residual sample of the Cb component in the current block, based on the prediction type of the coding unit, the cbf information for the Cr component, the cbf information for the Cb component; and determining, when the chroma joint information represents that the chroma sample is encoded in the current block, the weight of the residual sample of the Cr component and the weight of the residual sample of the Cb component, based on the prediction type of the coding unit, the cbf information for the Cr component, the cbf information for the Cb component.

According to an embodiment, the weight of the residual sample of the Cr component may be −½, and the weight of the residual sample of the Cb component may be 1.

According to an embodiment, the weight of the residual sample of the Cr component may be −1, and the weight of the residual sample of the Cb component may be 1.

According to an embodiment, the weight of the residual sample of the Cr component may be 1, and the weight of the residual sample of the Cb component may be −½.

According to an embodiment, the determining of the weight of the residual sample of the Cr component and the weight of the residual sample of the Cb component may include setting the number of joint modes corresponding to combinations of weights of the residual sample of the Cr component and weights of the residual sample of the Cb component, differently, depending on whether the prediction type of the coding unit is an intra prediction mode or an inter prediction mode.

According to an embodiment, the determining of the weight of the residual sample of the Cr component and the weight of the residual sample of the Cb component may include selecting, when the prediction type of the coding unit is the intra prediction mode, a joint mode from among a plurality of joint modes based on the cbf information for the Cr component and the cbf information for the Cb component, and determining the weight of the residual sample of the Cr component and the weight of the residual sample of the Cb component according to the selected joint mode.

According to an embodiment, the determining of the weight of the residual sample of the Cr component and the weight of the residual sample of the Cb component may include determining the weight of the residual sample of the Cr component and the weight of the residual sample of the Cb component according to a joint mode allowed when the prediction type of the coding unit is the inter prediction mode.

The video decoding method according to an embodiment may include: determining a joint mode including the weight of the residual sample of the Cr component and the weight of the residual sample of the Cb component, based on the chroma joint information, the cbf information for the Cr component, and the cbf information for the Cb component; and determining a quantization parameter for the current block, based on the joint mode.

A video decoding device according to an embodiment proposed in the disclosure includes: an obtainer configured to obtain, from a bitstream, information representing a prediction type of a coding unit including a current block, obtain, from the bitstream, cbf information for a Cr component of the current block and cbf information for a Cb component of the current block, and obtain, from the bitstream, a chroma joint residual sample of the current block; and a decoder configured to determine a weight of a residual sample of the Cr component and a weight of a residual sample of the Cb component, based on the prediction type of the coding unit, the cbf information for the Cr component, and the cbf information for the Cb component, reconstruct the residual sample of the Cr component by using the chroma joint residual sample of the current block and the weight of the residual sample of the Cr component, and reconstruct the residual sample of the Cb component by using the chroma joint residual sample of the current block and the weight of the residual sample of the Cb component.

The obtainer according to an embodiment may be configured to obtain, from the bitstream, chroma joint information representing whether a chroma sample is encoded to represent the residual sample of the Cb component and the residual sample of the Cr component, corresponding to the residual sample of the Cb component in the current block, based on the prediction type of the coding unit, the cbf information for the Cr component, the cbf information for the Cb component, and the decoder may be configured to determine, when the chroma joint information represents that the chroma sample is encoded, the weight of the residual sample of the Cr component and the weight of the residual sample of the Cb component, based on the prediction type of the coding unit, the cbf information for the Cr component, the cbf information for the Cb component, and set the number of joint modes corresponding to combinations of weights of the residual sample of the Cr component and weights of the residual sample of the Cb component, differently, depending on whether the prediction type of the coding unit is an intra prediction mode or an inter prediction mode.

The decoder according to an embodiment may be configured to determine the weight of the residual sample of the Cr component and the weight of the residual sample of the Cb component according to a joint mode allowed when the prediction type of the coding unit is the inter prediction mode.

A video encoding method according to an embodiment proposed in the disclosure includes: determining a prediction type of a coding unit including a current block; determining cbf information for a Cr component of the current block and cbf information for a Cb component of the current block; determining a weight of a residual sample of the Cr component and a weight of a residual sample of the Cb component, based on the prediction type of the coding unit, the cbf information for the Cr component, and the cbf information for the Cb component; and generating a chroma joint residual sample of the current block, wherein the residual sample of the Cr component is reconstructed by using the chroma joint residual sample of the current block and the weight of the residual sample of the Cr component, and the residual sample of the Cb component is reconstructed by using the chroma joint residual sample of the current block and the weight of the residual sample of the Cb component.

The video encoding method according to an embodiment may further include generating chroma joint information representing whether a chroma sample is encoded to represent the residual sample of the Cb component and the residual sample of the Cr component, corresponding to the residual sample of the Cb component in the current block, wherein, when the chroma sample is encoded in the current block, the weight of the residual sample of the Cr component and the weight of the residual sample of the Cb component may be determined based on the prediction type of the coding unit, the cbf information for the Cr component, the cbf information for the Cb component, and the number of joint modes corresponding to combinations of weights of the residual sample of the Cr component and weights of the residual sample of the Cb component may be set differently depending on whether the prediction type of the coding unit is an intra prediction mode or an inter prediction mode.

According to an embodiment, the determining of the weight of the residual sample of the Cr component and the weight of the residual sample of the Cb component may include selecting, when the prediction type of the coding unit is the intra prediction mode, a joint mode from among a plurality of joint modes based on the cbf information for the Cr component and the cbf information for the Cb component, and determining the weight of the residual sample of the Cr component and the weight of the residual sample of the Cb component according to the selected joint mode; and determining the weight of the residual sample of the Cr component and the weight of the residual sample of the Cb component according to a joint mode allowed when the prediction type of the coding unit is the inter prediction mode.

According to an embodiment of the disclosure, provided is a computer-readable recording medium having recorded thereon a program for implementing the video decoding method on a computer.

According to an embodiment of the disclosure, provided is a computer-readable recording medium having recorded thereon a program for implementing the video encoding method on a computer.

The disclosure can have various modifications and various embodiments, and specific embodiments are shown in the drawings and described in detail in the detailed description, although the disclosure is not limited to the embodiments. However, it has to be understood that the disclosure includes all modifications, equivalents, and substitutes included in the concept and technical scope of the various embodiments.

In the following description about the embodiments, if it is determined that detailed descriptions for related art make the subject matter of the disclosure obscure unnecessarily, the detailed descriptions will be omitted. Also, numbers (for example, a first, a second, and the like) used in the description of the specification are merely identifiers or identifier codes for distinguishing one component from another.

Also, in the present specification, it will be understood that when a component is "connected" or "coupled" to another component, the one component may be directly connected or coupled to the other component, or the one component may be connected or coupled to the other component with an intervening component therebetween, unless specified otherwise.

In the present specification, regarding a component represented as a "unit", a "module", etc., two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a direction of a list $0$ may denote a motion vector used to indicate a block in a reference picture included in the list $0$, and a motion vector in a direction of a list $1$ may denote a motion vector used to indicate a block in a reference picture included in the list $1$. Also, a motion vector in a unidirection may denote a motion vector used to indicate a block in a reference picture included in the list $0$ or list $1$, and a motion vector in a bidirection may denote that the motion vector includes a motion vector in a direction of the list $0$ and a motion vector in a direction of the list $1$.

Hereinafter, an image encoding device and an image decoding device, and an image encoding method and an image decoding method according to embodiments will be described with reference to FIGS. $1$ to $16$. A method of determining a data unit of an image, according to an embodiment, will be described with reference to FIGS. $3$ to $16$, and a video encoding/decoding method using a tile and a tile group will be described with reference to FIGS. $17$ to $28$.

Hereinafter, with reference to FIGS. $1$ and $2$, a method and apparatus for adaptive selection based on coding units of various shapes according to an embodiment of the disclosure will be described.

FIG. $1$ is a schematic block diagram of an image decoding device according to an embodiment.

An image decoding device $100$ may include a receiver $110$ and a decoder $120$. The receiver $110$ and the decoder $120$ may include at least one processor. Also, the receiver $110$ and the decoder $120$ may include a memory storing instructions to be performed by the at least one processor.

The receiver $110$ may receive a bitstream. The bitstream includes information of an image encoded by an image encoding device $2200$ to be described below. Also, the bitstream may be transmitted from the image encoding device $2200$. The image encoding device $2200$ and the image decoding device $100$ may be connected by wire or wirelessly, and the receiver $110$ may receive the bitstream by wire or wirelessly. The receiver $110$ may receive the bitstream from a storage medium, such as an optical medium or a hard disk. The decoder $120$ may reconstruct an image based on information obtained from the received bitstream. The decoder $120$ may obtain, from the bitstream, a syntax element for reconstructing the image. The decoder $120$ may reconstruct the image based on the syntax element.

Example operations of the image decoding device $100$ will be described in detail with reference to FIG. $2$.

FIG. $2$ is a flowchart of a video decoding method according to an embodiment.

According to an embodiment of the disclosure, the receiver 110 receives a bitstream.

The image decoding device 100 obtains, from a bitstream, a bin string corresponding to a split shape mode of a coding unit in operation 210. The image decoding device 100 determines a split rule of the coding unit in operation 220. Also, the image decoding device 100 splits the coding unit into a plurality of coding units, based on at least one of the bin string corresponding to the split shape mode and the split rule in operation 230. The image decoding device 100 may determine an allowable first range of a size of the coding unit, according to a ratio of the width and the height of the coding unit, in order to determine the split rule. The image decoding device 100 may determine an allowable second range of the size of the coding unit, according to the split shape mode of the coding unit, in order to determine the split rule.

Hereinafter, an example splitting of a coding unit will be described in detail according to an embodiment of the disclosure.

First, one picture may be split into one or more slices or one or more tiles. One slice or one tile may be a sequence of one or more largest coding units (for example coding tree units (CTUs)). A largest coding block (for example coding tree block (CTB)) conceptually compared to a largest coding unit (CTU).

The largest coding block (CTU) denotes an N×N block including N×N samples (where N is an integer). Each color component may be split into one or more largest coding blocks.

When a picture has three sample arrays (for example sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding tree block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a coding unit, or a largest coding unit, refers to a data structure including a coding block, or a largest coding block, including a corresponding sample and a syntax structure corresponding to the coding block, or the largest coding block. However, because it is understood by one of ordinary skill in the art that a coding unit, or a largest coding unit, or a coding block, or a largest coding block, refers to a block of a predetermined size including a predetermined number of samples, a largest coding block and a largest coding unit, or a coding block and a coding unit are mentioned in the following specification without being distinguished unless otherwise described.

An image may be split into largest coding units (for example CTUs). A size of each largest coding unit may be determined based on information obtained from a bitstream. A shape of each largest coding unit may be a square shape of the same size. However, embodiments are not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad_split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding device 100 may obtain, from the bitstream, the split shape mode information from one bin string. A form of the bitstream received by the image decoding device 100 may include fixed length binary code, unary code, truncated unary code, predetermined binary code, or the like. The bin string is information in a binary number. The bin string may include at least one bit. The image decoding device 100 may obtain the split shape mode information corresponding to the bin string, based on the split rule. The image decoding device 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of the coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. Examples of the splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may be unrelated to each other.

In another embodiment, prediction may be performed by using a coding unit as a prediction unit. Also, transformation may be performed by using a coding unit as a transform block.

Examples of the splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block. The adjacent block may be adjacent to the current block spatially or temporally. The adjacent block may be located at one of the lower left, left, upper left, top, upper right, right, lower right of the current block.

Figure 3:
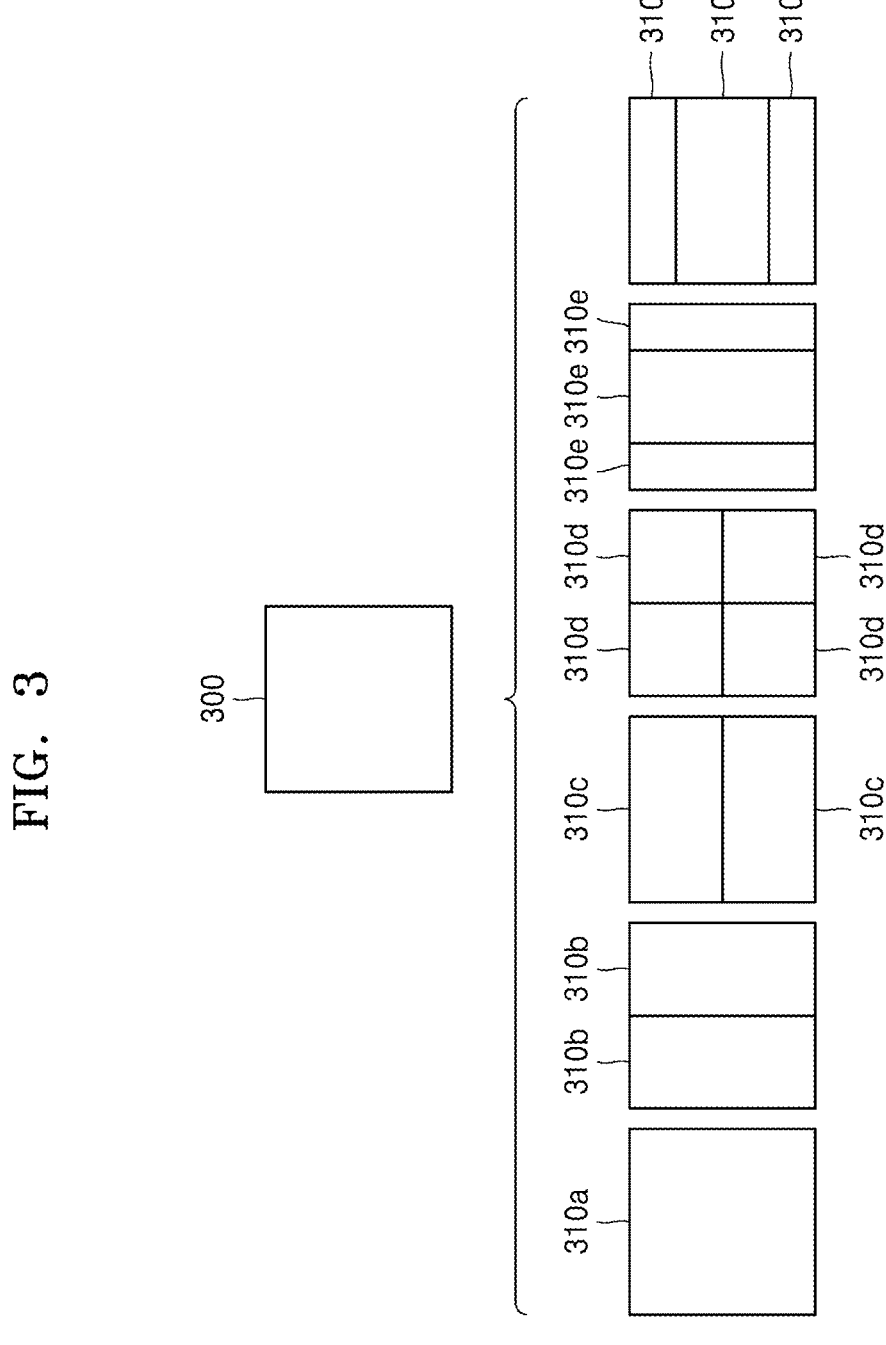
FIG. 3 illustrates a process, performed by an image decoding device, of determining at least one coding unit by splitting a current coding unit, according to an embodiment.

FIG. 3 illustrates a process, performed by a video decoding device, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (for example, when the block shape of the coding unit is 4N×4N), the image decoding device 100 may determine the block shape information of the coding unit as a square. The image decoding device 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding device 100 may determine the block shape information of the coding unit as a non-square shape. When the shape of the coding unit is non-square, the image decoding device 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding device 100 may determine whether the coding unit is in a horizontal direction or a vertical direction, based on the length of the width and the length of the height of the coding unit. Also, the image decoding device 100 may determine the size of the coding unit, based on at least one of the length of the width, the length of the height, or the area of the coding unit.

According to an embodiment, the image decoding device 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding device 100.

The image decoding device 100 may obtain the split shape mode information from a bitstream. However, embodiments are not limited thereto, and the image decoding device 100 and the image encoding device 2200 may determine pre-agreed split shape mode information, based on the block shape information. The image decoding device 100 may determine the pre-agreed split shape mode information with respect to a largest coding unit or a minimum coding unit. For example, the image decoding device 100 may determine split shape mode information with respect to the largest coding unit to be a quad split. Also, the image decoding device 100 may determine split shape mode information regarding the smallest coding unit to be "not to perform splitting", or no split. In particular, the image decoding device 100 may determine the size of the largest coding unit to be 256×256. The image decoding device 100 may determine the pre-agreed split shape mode information to be a quad split. The quad split is a split shape mode in which the width and the height of the coding unit are both bisected. The image decoding device 100 may obtain a coding unit of a 128×128 size from the largest coding unit of a 256×256 size, based on the split shape mode information. Also, the image decoding device 100 may determine the size of the smallest coding unit to be 4×4. The image decoding device 100 may obtain split shape mode information indicating "not to perform splitting" with respect to the smallest coding unit.

According to an embodiment, the image decoding device 100 may use the block shape information indicating that the current coding unit has a square shape. For example, the image decoding device 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310*a* having the same size as the current coding unit 300, based on the split shape mode information indicating not to perform splitting, or may determine coding units 310*b*, 310*c*, 310*d*, 310*e*, or 310*f* which are split based on a splitting method indicated by the split shape mode information.

Referring to FIG. 3, according to an embodiment, the image decoding device 100 may determine two coding units 310*b* obtained by splitting the current coding unit 300 in a vertical direction, based on the split shape mode information indicating to perform splitting in a vertical direction. The image decoding device 100 may determine two coding units 310*c* obtained by splitting the current coding unit 300 in a horizontal direction, based on the split shape mode information indicating to perform splitting in a horizontal direction. The image decoding device 100 may determine four coding units 310*d* obtained by splitting the current coding unit 300 in vertical and horizontal directions, based on the split shape mode information indicating to perform splitting in vertical and horizontal directions. According to an embodiment, the image decoding device 100 may determine three coding units 310*e* obtained by splitting the current coding unit 300 in a vertical direction, based on the split shape mode information indicating to perform ternary splitting in a vertical direction. The image decoding device 100 may determine three coding units 310*f* obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Examples of predetermined splitting methods of splitting the square coding unit will be described in detail below in relation to various embodiments.

FIG. 4 illustrates a process, performed by a video decoding device, of determining at least one coding unit by splitting a non-square coding unit, according to an embodiment.

According to an embodiment, the image decoding device 100 may use block shape information indicating that a current coding unit has a non-square shape. The image decoding device 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding device 100 may determine a coding unit 410 having the same size as the current coding unit 400 or coding unit 460 having the same size as the current coding unit 450, based on the split shape mode information indicating not to perform splitting, or may determine coding units 420*a* and 420*b*, 430*a* to 430*c*, 470*a* and 470*b*, or 480*a* to 480*c* split based on a splitting method indicated by the split shape mode information. Examples of predetermined splitting methods of splitting a non-square coding unit will be described in detail below in relation to various embodiments.

According to an embodiment, the image decoding device 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding device 100 may determine two coding units 420*a* and 420*b* included in the current coding unit 400, or 470*a* and 470*b* included in the current coding unit 450, by splitting the current coding unit 400 or 450 based on the split shape mode information.

According to an embodiment, when the image decoding device 100 splits the non-square current coding unit 400 or 450 based on the split shape mode information, the image decoding device 100 may consider the location of a long side of the non-square current coding unit 400 or 450 to split a current coding unit. For example, the image decoding device 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split a coding unit into an odd number of blocks, for example in a ternary split, the image decoding device 100 may determine an odd number of coding units included in the current coding unit 400 or 450. For example, when the split shape mode information indicates to split the current coding unit 400 or 450 into three coding units, the image decoding device 100 may split the current coding unit 400 into three coding units 430*a*, 430*b*, and 430*c*, or split the current coding unit 450 into three coding units 480*a*, 480*b*, and 480*c*.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding device 100 may determine to split a current coding unit into an odd number of blocks, based on the split shape mode information. Also, the image decoding device 100 may determine a split direction of the current coding unit 400 or 450, based on the block shape information of the current coding unit 400 or 450. For example, when the current coding unit 400 is in the vertical direction, the image decoding device 100 may determine the coding units 430*a*, 430*b*, and 430*c* by splitting the current coding unit 400 in the horizontal direction. Also, when the current coding unit 450 is in the horizontal direction, the image decoding device 100 may determine the coding units 480*a*, 480*b*, and 480*c* by splitting the current coding unit 450 in the vertical direction.

According to an embodiment, the image decoding device 100 may determine an odd number of coding units included in the current coding unit 400 or 450, and not all the determined coding units may have the same size. For example, a predetermined coding unit 430*b* from among the determined odd number of coding units 430*a*, 430*b*, and 430c may have a size different from the size of the other coding units 430a and 430c, or a predetermined coding unit 480b from among the determined odd number of coding units 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding device 100 may determine the odd number of coding units included in the current coding unit 400 or 450, and moreover, may put a predetermined restriction on at least one coding unit from among the odd number of coding units generated by splitting the current coding unit 400 or 450. Referring to FIG. 4, the image decoding device 100 may set a decoding process regarding the coding unit 430b or 480b located at the center among the three coding units 430a, 430b, and 430c generated as the current coding unit 400 is split, to be different from that of the other coding units 430a and 430c, or may set a decoding process regarding the coding unit 480b located at the center among the three coding units, or 480a, 480b, and 480c generated as the current coding unit 400 or 450 is split to be different from that of the other coding units 430a and 430c, or 480a and 480c. For example, the image decoding device 100 may restrict the coding unit 430b or 480b at the center location to be no longer split or to be split only a predetermined number of times, unlike the other coding units 430a and 430c, or 480a and 480c.

Figure 5:
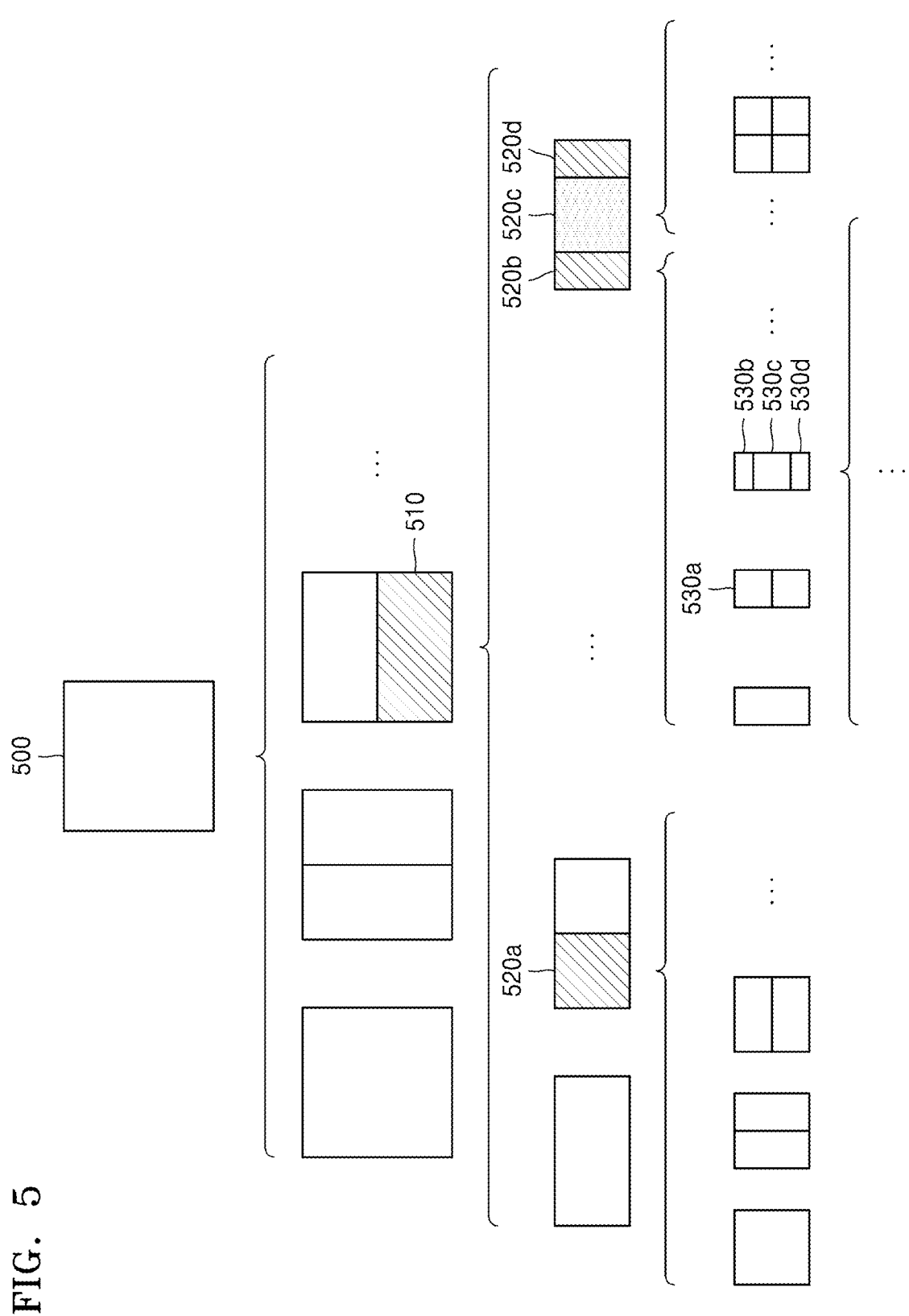
FIG. 5 illustrates a process, performed by an image decoding device, of splitting a coding unit based on at least one of block shape information and split shape mode information, according to an embodiment.

FIG. 5 illustrates a process, performed by a video decoding device, of splitting a coding unit based on at least one of block shape information and split shape mode information, according to an embodiment.

According to an embodiment, the image decoding device 100 may determine to split or to not split a square first coding unit 500 into coding units, based on at least one of the block shape information and the split shape mode information. According to an embodiment, when the split shape mode information indicates to split the first coding unit 500 in a horizontal direction, the image decoding device 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding device 100 may determine to split or to not split the determined second coding unit 510 into coding units, based on the split shape mode information. Referring to FIG. 5, the image decoding device 100 may split the non-square second coding unit 510, which is determined by splitting the first coding unit 500, into one or more third coding units 520a, 520b, 520c, and 520d based on at least one of the split shape information and the split shape mode information, or may not split the non-square second coding unit 510. The image decoding device 100 may obtain the split shape mode information, and may obtain a plurality of various-shaped second coding units (for example second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (for example a coding unit located at a center location, or a square coding unit) from among an odd number of third coding units 520b, 520c, and 520d determined by splitting the non-square second coding unit 510 may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding device 100 may split each of the third coding units 520a, or 520b, 520c, and 520d into coding units, based on the split shape mode information. Also, the image decoding device 100 may determine to not split the second coding unit 510 based on the split shape mode information. According to an embodiment, the image decoding device 100 may split the non-square second coding unit 510 into the odd number of third coding units 520b, 520c, and 520d. The image decoding device 100 may put a predetermined restriction on a predetermined third coding unit from among the odd number of third coding units 520b, 520c, and 520d. For example, the image decoding device 100 may restrict the third coding unit 520c at a center location from among the odd number of third coding units 520b, 520c, and 520d to be no longer split or to be split a settable number of times.

Referring to FIG. 5, the image decoding device 100 may restrict the third coding unit 520c, which is at the center location from among the odd number of third coding units 520b, 520c, and 520d included in the non-square second coding unit 510, to be no longer split, to be split by using a predetermined splitting method (for example split into only four coding units or split by using a splitting method of the second coding unit 510), or to be split only a predetermined number of times (for example split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding device 100 may obtain the split shape mode information, which is used to split a current coding unit, from a predetermined location in the current coding unit.

Figure 6:
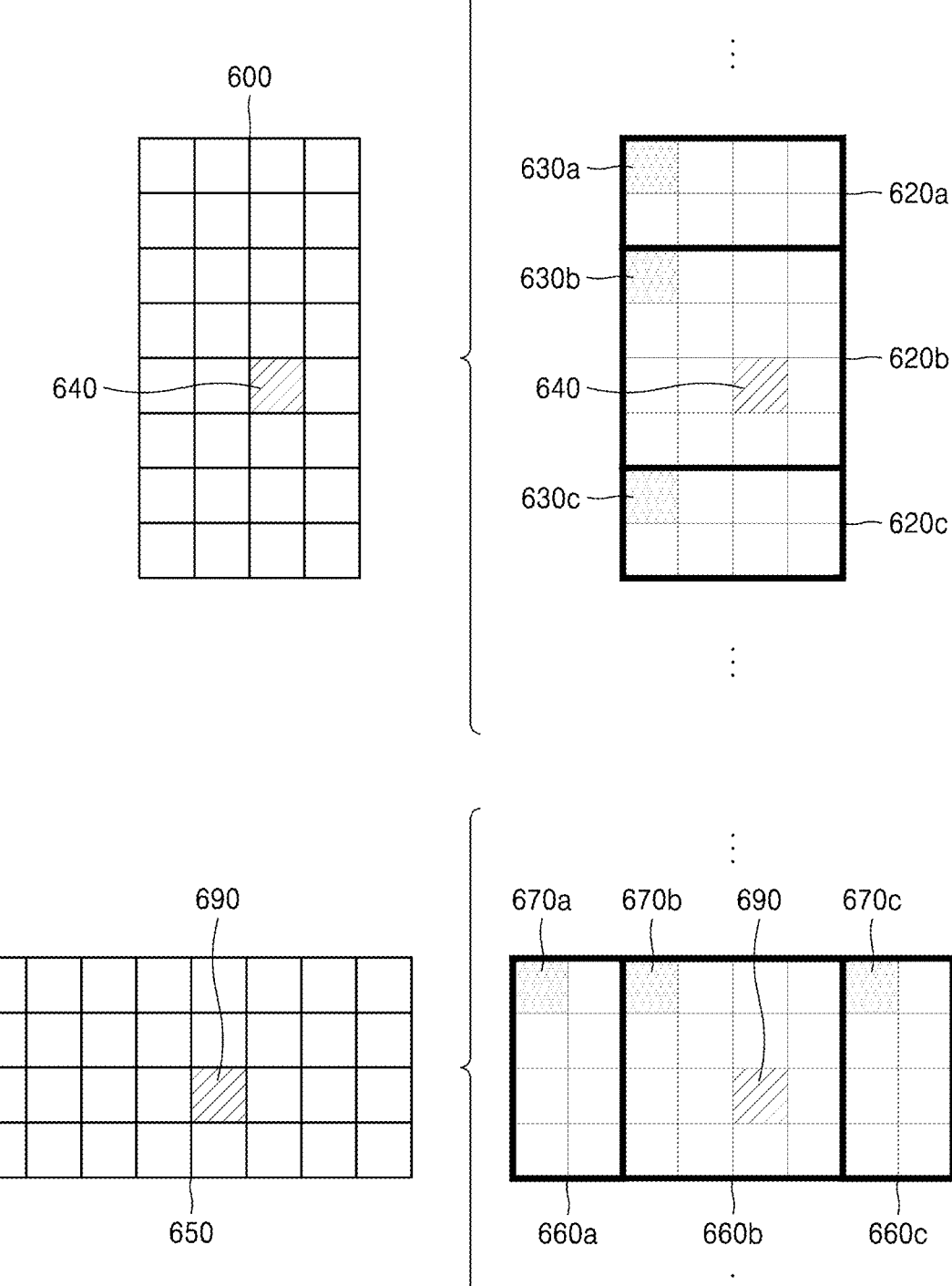
FIG. 6 illustrates a method, performed by an image decoding device, of determining a predetermined coding unit from among an odd number of coding units, according to an embodiment.

FIG. 6 illustrates a method, performed by a video decoding device, of determining a predetermined coding unit from among an odd number of coding units, according to an embodiment.

Referring to FIG. 6, split shape mode information of a current coding unit 600 or 650 may be obtained from a sample of a predetermined location (for example a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding device 100 may obtain the split shape mode information from the predetermined location and may determine to split or to not split the current coding unit into various-shaped and various-sized coding units.

According to an embodiment, when the current coding unit is split into a predetermined number of coding units, the image decoding device 100 may select one of the coding units. Various methods may be used to select one of a plurality of coding units, examples of which will be described below in relation to various embodiments.

According to an embodiment, the image decoding device 100 may split the current coding unit into a plurality of coding units, and may determine a coding unit at a predetermined location.

According to an embodiment, the image decoding device 100 may use information indicating locations of the odd number of coding units, to determine a coding unit at a center location from among the odd number of coding units. Referring to FIG. 6, the image decoding device 100 may determine the odd number of coding units 620a, 620b, and 620c or the odd number of coding units 660a, 660b, and 660c by splitting the current coding unit 600 or the current coding unit 650. The image decoding device 100 may determine the middle coding unit 620b or the middle coding unit 660b by using information about the locations of the odd number of coding units 620a, 620b, and 620c or the odd number of coding units 660a, 660b, and 660c. For example, the image decoding device 100 may determine the coding unit 620b of the center location by determining the locations of the coding units 620a, 620b, and 620c based on information indicating locations of predetermined samples included in the coding units 620a, 620b, and 620c. In detail, the image decoding device 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding device 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the center coding unit 620b may include coordinates (xb, yb), and information indicating the location of the upper-left sample 630c of the lower coding unit 620c may include coordinates (xc, yc). The image decoding device 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding device 100 may split the current coding unit 600 into a plurality of coding units 620a, 620b, and 620c, and may select one of the coding units 620a, 620b, and 620c based on a predetermined criterion. For example, the image decoding device 100 may select the coding unit 620b, which has a size different from that of the others, from among the coding units 620a, 620b, and 620c.

According to an embodiment, the image decoding device 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding device 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding device 100 may determine the width of the upper coding unit 620a to be the width of the current coding unit 600. The image decoding device 100 may determine the height of the upper coding unit 620a to be yb-ya. According to an embodiment, the image decoding device 100 may determine the width of the middle coding unit 620b to be the width of the current coding unit 600. The image decoding device 100 may determine the height of the middle coding unit 620b to be yc-yb. According to an embodiment, the image decoding device 100 may determine the width or height of the lower coding unit 620c by using the width or height of the current coding unit 600 or the widths or heights of the upper coding unit 620a and middle coding unit 620b. The image decoding device 100 may determine a coding unit, which has a size different from that of the other coding units, based on the determined widths and heights of the coding units 620a, 620b, and 620c. Referring to FIG. 6, the image decoding device 100 may determine the middle coding unit 620b, which has a size different from the size of the upper coding unit 620a and lower coding unit 620c, as the coding unit of the predetermined location. However, the above-described method, performed by the image decoding device 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding device 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-left sample 670c of the right coding unit 660c. The image decoding device 100 may determine the respective sizes of the coding units 660a, 660b, and 660c by using coordinates (xd, yd), (xe, ye), and (xf, yf) indicating the locations of the coding units 660a, 660b, and 660c.

According to an embodiment, the image decoding device 100 may determine the width of the left coding unit 660a to be xe-xd. The image decoding device 100 may determine the height of the left coding unit 660a to be the height of the current coding unit 650. According to an embodiment, the image decoding device 100 may determine the width of the middle coding unit 660b to be xf-xe. The image decoding device 100 may determine the height of the middle coding unit 660b to be the height of the current coding unit 650. According to an embodiment, the image decoding device 100 may determine the width or height of the right coding unit 660c by using the width or height of the current coding unit 650 or the widths or heights of the left coding unit 660a and middle coding unit 660b. The image decoding device 100 may determine a coding unit, which has a size different from that of the other coding units, based on the determined widths and heights of the coding units 660a, 660b, and 660c. Referring to FIG. 6, the image decoding device 100 may determine the middle coding unit 660b, which has a size different from the sizes of the left coding unit 660a and right coding unit 660c, as the coding unit of the predetermined location. However, the above-described method, performed by the image decoding device 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding device 100 may select a coding unit at a predetermined location from among an odd number of coding units determined by splitting the current coding unit, by considering the shape of the current coding unit. For example, when the current coding unit has a non-square shape, a width of which is longer than a height, the image decoding device 100 may determine the coding unit at the predetermined location in a horizontal direction. That is, the image decoding device 100 may determine one of coding units at different locations in a horizontal direction and may put a restriction on the coding unit. When the current coding unit has a non-square shape, a height of which is longer than a width, the image decoding device 100 may determine the coding unit at the predetermined location in a vertical direction. That is, the image decoding device 100 may determine one of coding units at different locations in a vertical direction and may put a restriction on the coding unit.

According to an embodiment, the image decoding device 100 may use information indicating respective locations of an even number of coding units, to determine the coding unit at the predetermined location from among the even number of coding units. The image decoding device 100 may determine an even number of coding units by splitting (for example binary splitting) the current coding unit, and may determine the coding unit at the predetermined location by using the information about the locations of the even number of coding units. An operation related thereto may correspond to the operation of determining a coding unit at a predetermined location (for example a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding device 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding device 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding device 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding device 100 may use the split shape mode information, which is obtained from a sample at a predetermined location in the current coding unit 600 (for example a sample at a center location of the current coding unit 600) to determine a coding unit at a predetermined location from among the plurality of the coding units 620a, 620b, and 620c determined by splitting the current coding unit 600 (for example a coding unit at a center location from among a plurality of split coding units). That is, the image decoding device 100 may determine the sample at the predetermined location by considering a block shape of the current coding unit 600, may determine the coding unit 620b including a sample, from which predetermined information (for example the split shape mode information) can be obtained, from among the plurality of coding units 620a, 620b, and 620c determined by splitting the current coding unit 600, and may put a predetermined restriction on the coding unit 620b. Referring to FIG. 6, according to an embodiment, the image decoding device 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information can be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding device 100 may determine a sample located on a boundary for splitting at least one of a width and height of the current coding unit in half, as the sample from which the predetermined information can be obtained, by using at least one of information about the width of the current coding unit and information about the height of the current coding unit. As another example, when the block shape information of the current coding unit indicates a non-square shape, the image decoding device 100 may determine one of samples including a boundary for splitting a long side of the current coding unit in half, as the sample from which the predetermined information can be obtained.

According to an embodiment, when the current coding unit is split into a plurality of coding units, the image decoding device 100 may use the split shape mode information to determine a coding unit at a predetermined location from among the plurality of coding units. According to an embodiment, the image decoding device 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding device 100 may determine one or more coding units by splitting the current coding unit, and may determine an order of decoding the one or more coding units, based on a predetermined block (for example the current coding unit).

Figure 7:
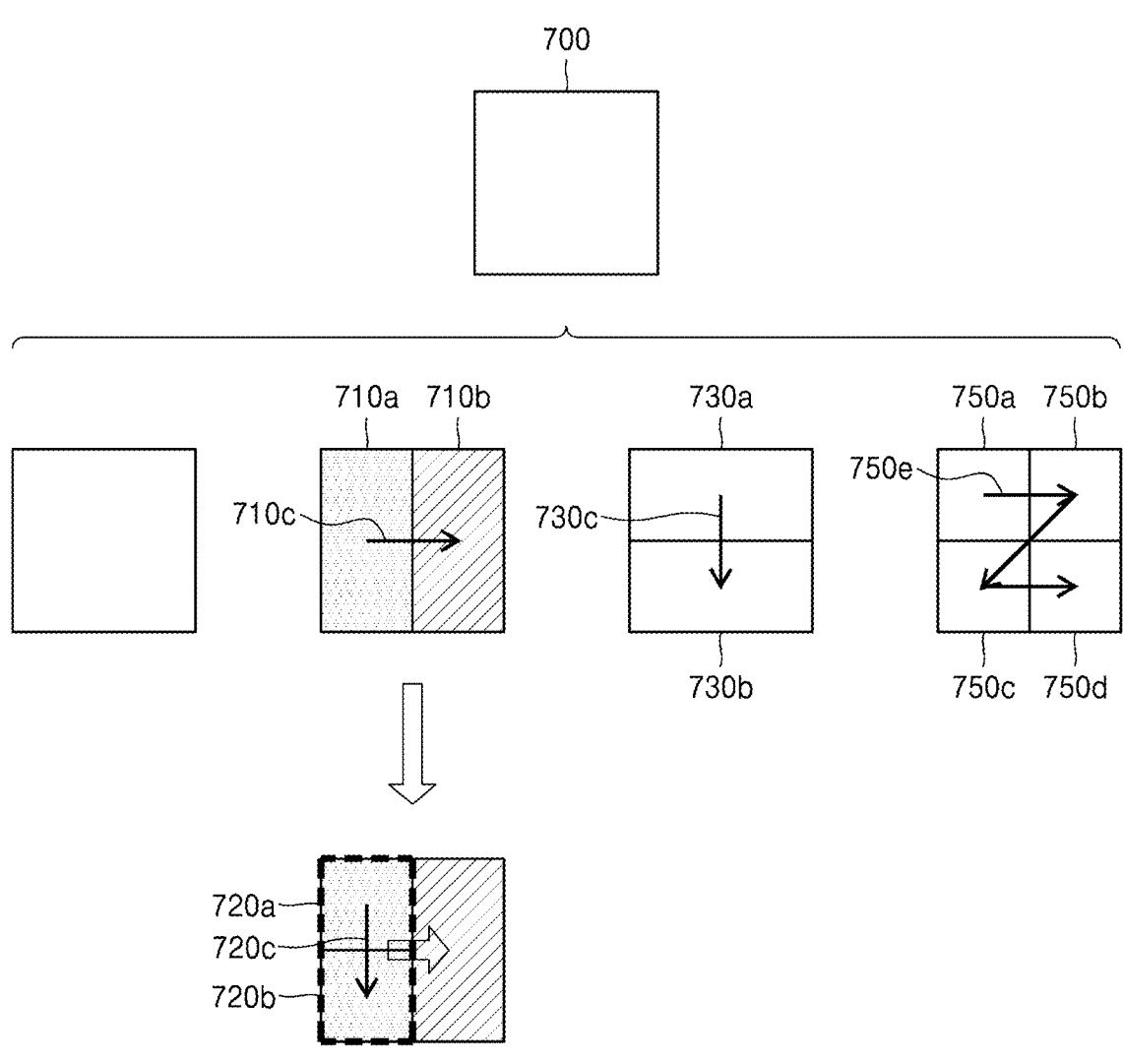
FIG. 7 illustrates an order of processing a plurality of coding units when an image decoding device determines the plurality of coding units by splitting a current coding unit, according to an embodiment.

FIG. 7 illustrates an order of processing a plurality of coding units when a video decoding device determines the plurality of coding units by splitting a current coding unit, according to an embodiment.

According to an embodiment, the image decoding device 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding device 100 may determine to process the second coding units 710a and 710b, which are determined by splitting the first coding unit 700 in a vertical direction, in a horizontal direction order 710c. The image decoding device 100 may determine to process the second coding units 730a and 730b, which are determined by splitting the first coding unit 700 in a horizontal direction, in a vertical direction order 730c. The image decoding device 100 may determine the second coding units 750a, 750b, 750c, and 750d, which are determined by splitting the first coding unit 700 in vertical and horizontal directions, according to a predetermined order (for example a raster scan order or Z-scan order 750e) by which coding units in a row are processed and then coding units in a next row are processed.

According to an embodiment, the image decoding device 100 may recursively split coding units. Referring to FIG. 7, the image decoding device 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding device 100 may determine the second coding units 710a and 710b by splitting the first coding unit 700 in a vertical direction, and may determine to independently split or to not split each of the second coding units 710a and 710b.

According to an embodiment, the image decoding device 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding device 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Also, because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
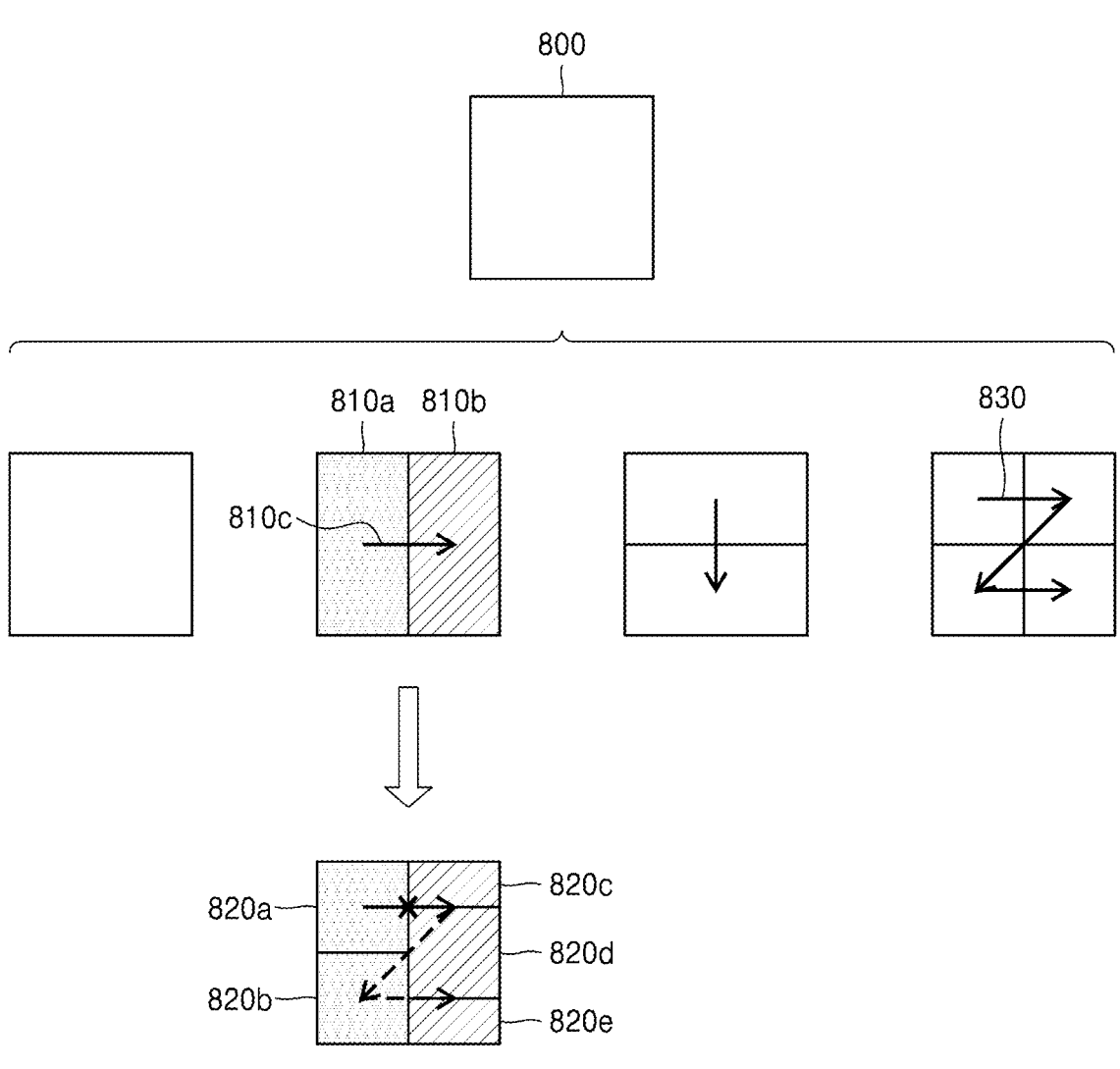
FIG. 8 illustrates a process, performed by an image decoding device, of determining that a current coding unit is to be split into an odd number of coding units, when the coding units are not processable in a predetermined order, according to an embodiment.

FIG. 8 illustrates a process, performed by a video decoding device, of determining that a current coding unit is to be split into an odd number of coding units, when the coding units are not processable in a predetermined order, according to an embodiment.

According to an embodiment, the image decoding device 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding device 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the video decoding device 100 may determine whether any coding unit is split into an odd number of coding units, by determining whether the third coding units 820a and 820b, and 820c, 820d, and 820e are processable in a predetermined order. Referring to FIG. 8, the image decoding device 100 may determine the third coding units 820a and 820b, and 820c, 820d, and 820e by recursively splitting the first coding unit 800. The image decoding device 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a predetermined order (for example a Z-scan order 830), and the image decoding device 100 may determine whether the third coding units 820c, 820d, and 820e, which are determined by splitting the right second coding unit 810b into an odd number of coding units, satisfy a condition for processing in the predetermined order.

According to an embodiment, the image decoding device 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding device 100 may determine disconnection of a scan order, and may determine that the right second coding unit 810b is to be split into an odd number of coding units, based on a result of the determination. According to an embodiment, when a coding unit is split into an odd number of coding units, the image decoding device 100 may put a predetermined restriction on a coding unit at a predetermined location from among the split coding units. The restriction or the predetermined location has been described above in relation to various embodiments, and thus detailed descriptions thereof will not be provided herein.

Figure 9:
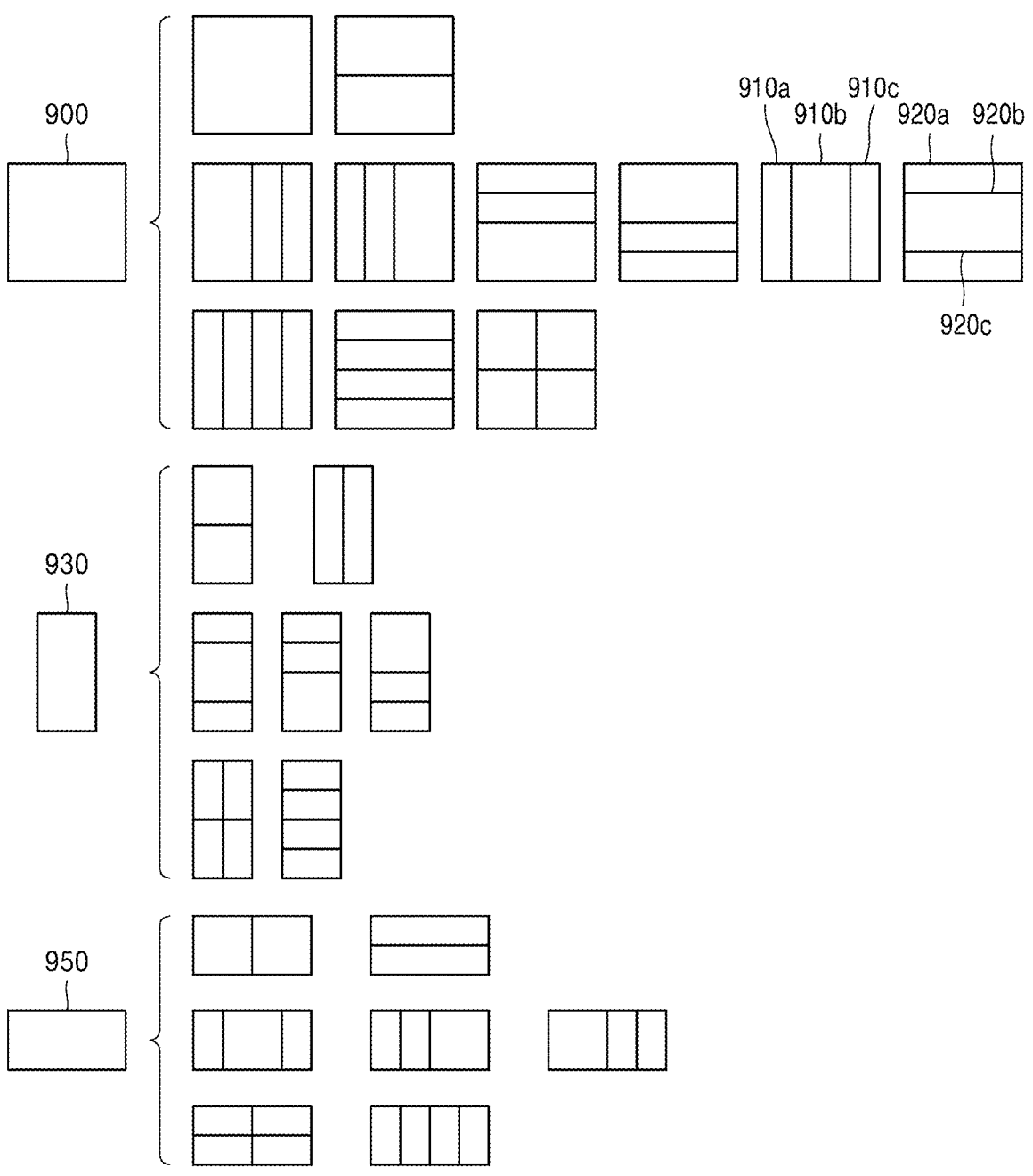
FIG. 9 illustrates a process, performed by an image decoding device, of determining at least one coding unit by splitting a first coding unit, according to an embodiment.

FIG. 9 illustrates a process, performed by a video decoding device, of determining at least one coding unit by splitting a first coding unit, according to an embodiment.

According to an embodiment, the image decoding device 100 may split a first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding device 100 may split the first coding unit 900 into a plurality of non-square coding units. In detail, when the split shape mode information indicates to determine an odd number of coding units by splitting the first coding unit 900 in a horizontal direction or a vertical direction, the image decoding device 100 may split the square first coding unit 900 into an odd number of coding units, for example second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding device 100 may determine whether the second coding units 910a, 910b, 910c, 920a, 920b, and 920c included in the first coding unit 900 satisfy a condition for processing in a predetermined order, and the condition may relate to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding device 100 may decide disconnection of a scan order, and may determine that the first coding unit 900 is to be split into an odd number of coding units, based on a result of the decision. According to an embodiment, when a coding unit is split into an odd number of coding units, the image decoding device 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding device 100 may determine various-shaped coding units by splitting a first coding unit.

Referring to FIG. 9, the image decoding device 100 may split the square first coding unit 900 or a non-square first coding unit 930 or 950 into various-shaped coding units.

Figure 10:
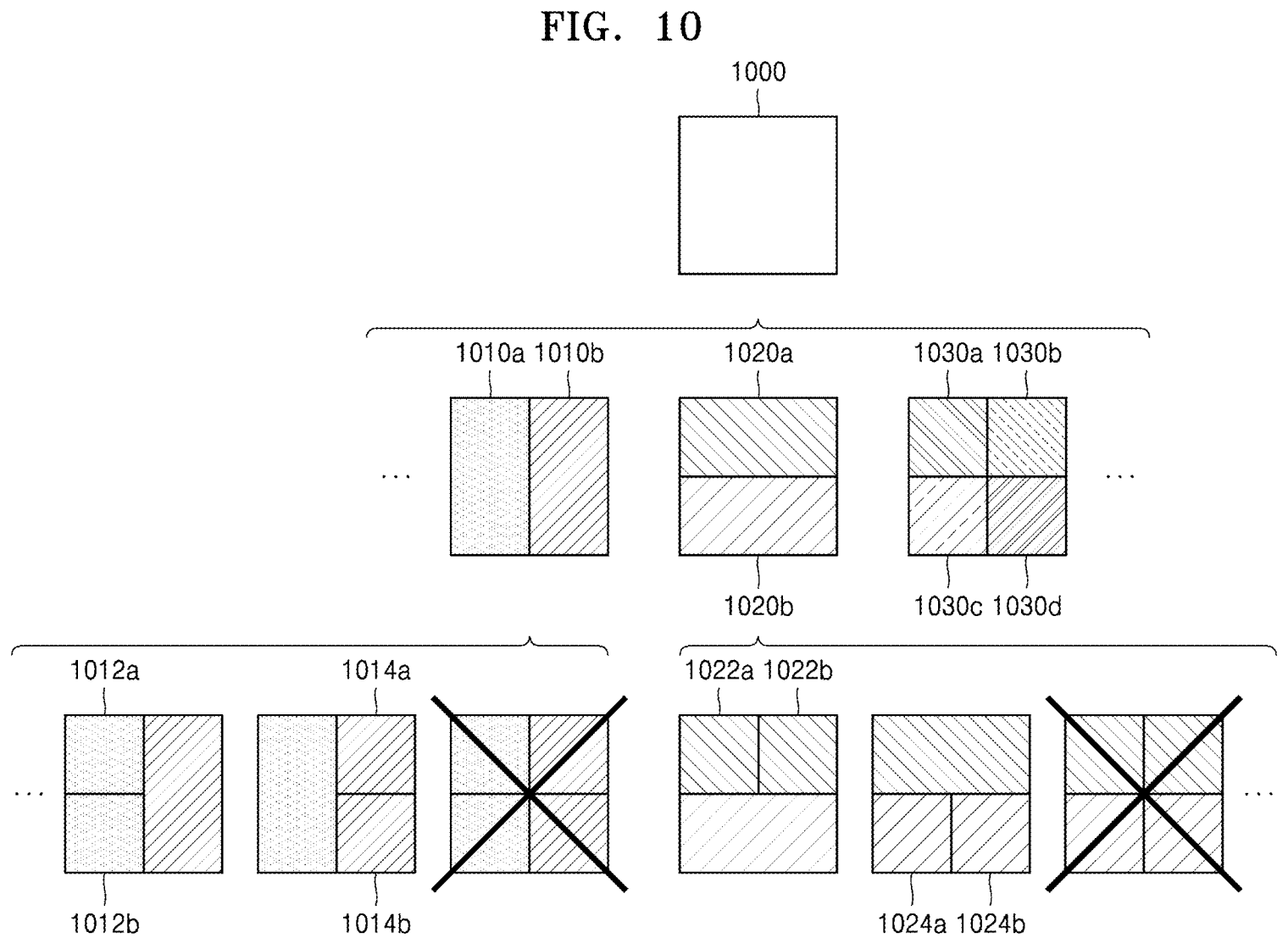

FIG. 10 illustrates that a shape into which a second coding unit is splittable is restricted when the second coding unit having a non-square shape, which is determined when a video decoding device splits a first coding unit, satisfies a predetermined condition, according to an embodiment.

According to an embodiment, the image decoding device 100 may determine to split a square first coding unit 1000 into non-square second coding units 1010a, and 1010b or 1020a and 1020b, based on split shape mode information, which is obtained by the receiver 110. The second coding units 1010a and 1010b, or 1020a and 1020b may be independently split. As such, the image decoding device 100 may determine to split or to not split each of the second coding units 1010a and 1010b, or 1020a and 1020b into a plurality of coding units, based on the split shape mode information of each of the second coding units 1010a and 1010b, or 1020a and 1020b. According to an embodiment, the image decoding device 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding device 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding device 100 splits the first coding unit 1000 into four square second coding units 1030a, 1030b, 1030c, and 1030d, based on the split shape mode information, and may be inefficient in terms of image decoding.

According to an embodiment, the image decoding device 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (for example the upper second coding unit 1020a) is split in a vertical direction, for the above-described reason, the image decoding device 100 may restrict the other second coding unit (for example the lower second coding unit 1020b) not to be split in a vertical direction in which the upper second coding unit 1020a is split.

Figure 11:
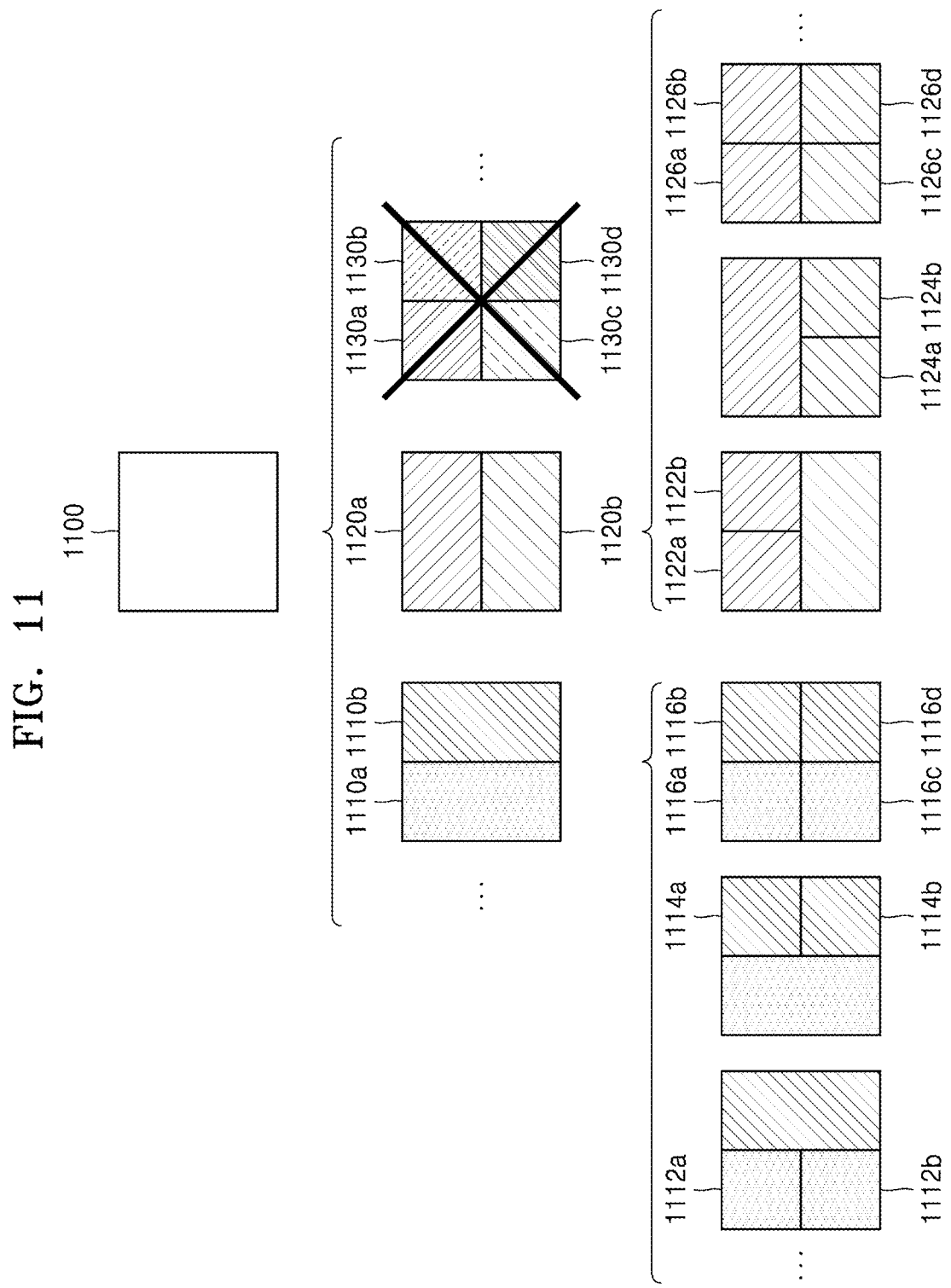
FIG. 11 illustrates a process, performed by an image decoding device, of splitting a square coding unit when split shape mode information is unable to indicate that the square coding unit is split into four square coding units, according to an embodiment.

FIG. 11 illustrates a process, performed by a video decoding device, of splitting a square coding unit when split shape mode information indicates that the square coding unit is not to be split into four square coding units, according to an embodiment.

According to an embodiment, the image decoding device 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding device 100 may not split the square first coding unit 1100 into four square second coding units 1130a, 1130b, 1130c, and 1130d. The image decoding device 100 may determine the non-square second coding units 1110a and 1110b, or 1120a and 1120b, etc., based on the split shape mode information.

According to an embodiment, the image decoding device 100 may independently split the non-square second coding units 1110a and 1110b, or 1120a and 1120b, etc. Each of the second coding units 1110a and 1110b, or 1120a and 1120b, etc. may be recursively split in a predetermined order, and this splitting method may correspond to a method of splitting the first coding unit 1100, based on the split shape mode information.

For example, the image decoding device 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding device 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100, which the split shape mode information may be unable to directly indicate, may be determined.

As another example, the image decoding device 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding device 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100, which the split shape mode information may be unable to directly indicate, may be determined.

Figure 12:
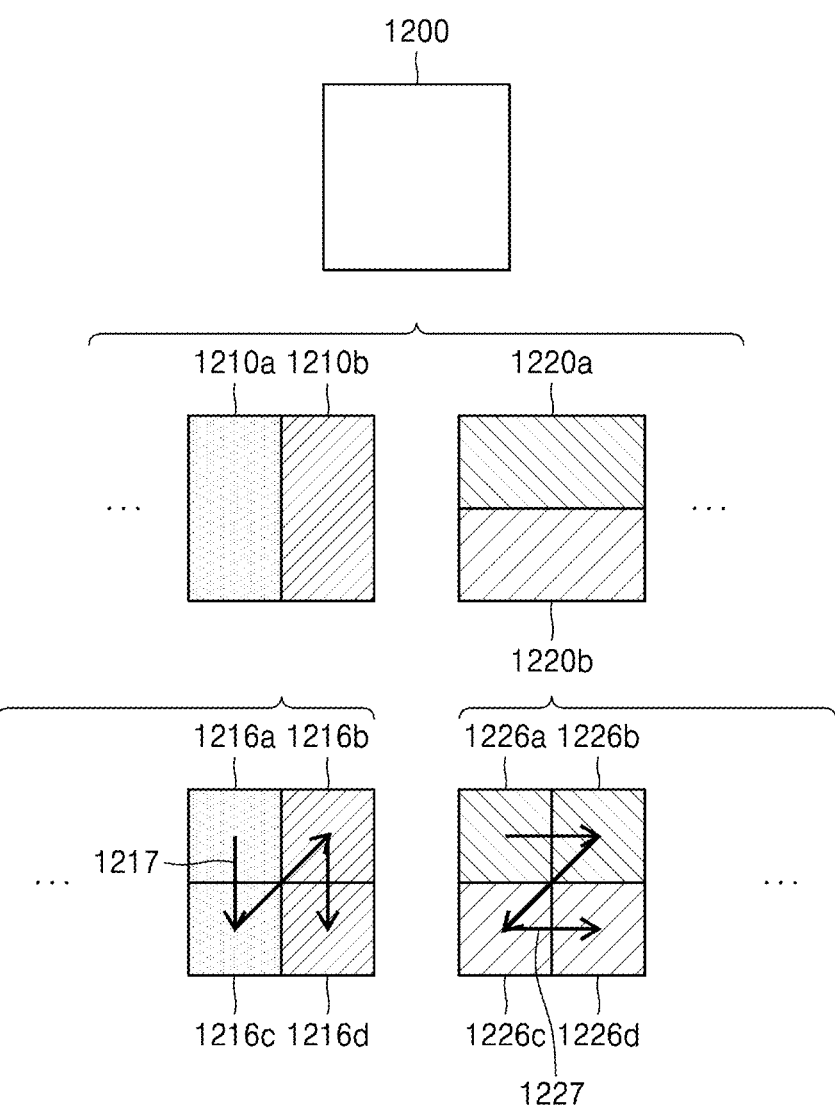
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding device 100 may split a first coding unit 1200, based on split shape mode information. When a block shape indicates a square shape and the split shape mode information indicates to split the first coding unit 1200 in at least one of horizontal and vertical directions, the image decoding device 100 may determine second coding units 1210a and 1210b, or 1220a and 1220*b*, etc. by splitting the first coding unit 1200. Referring to FIG. 12, the non-square second coding units 1210*a* and 1210*b*, determined by splitting the first coding unit 1200 in vertical direction, or 1220*a* and 1220*b* determined by splitting the first coding unit 1200 in a horizontal direction may be independently split based on the split shape mode information of each coding unit. For example, the image decoding device 100 may determine third coding units 1216*a*, 1216*b*, 1216*c*, and 1216*d* by splitting the second coding units 1210*a* and 1210*b* in a horizontal direction, and may determine third coding units 1226*a*, 1226*b*, 1226*c*, and 1226*d* by splitting the second coding units 1220*a* and 1220*b* in a vertical direction. An operation of splitting the second coding units 1210*a* and 1210*b*, or 1220*a* and 1220*b* has been described above in relation to FIG. 11, and thus detailed descriptions thereof will not be provided herein.

According to an embodiment, the image decoding device 100 may process coding units in a predetermined order. An operation of processing coding units in a predetermined order has been described above in relation to FIG. 7, and thus detailed descriptions thereof will not be provided herein. Referring to FIG. 12, the image decoding device 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding device 100 may determine processing orders of the third coding units 1216*a*, 1216*b*, 1216*c*, and 1216*d*, or 1226*a*, 1226*b*, 1226*c*, and 1226*d* based on a split shape by which the first coding unit 1200 is split.

According to an embodiment, the image decoding device 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding device 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding device 100 may process a plurality of coding units in different orders even when the coding units are eventually determined to be the same shape.

Figure 13:
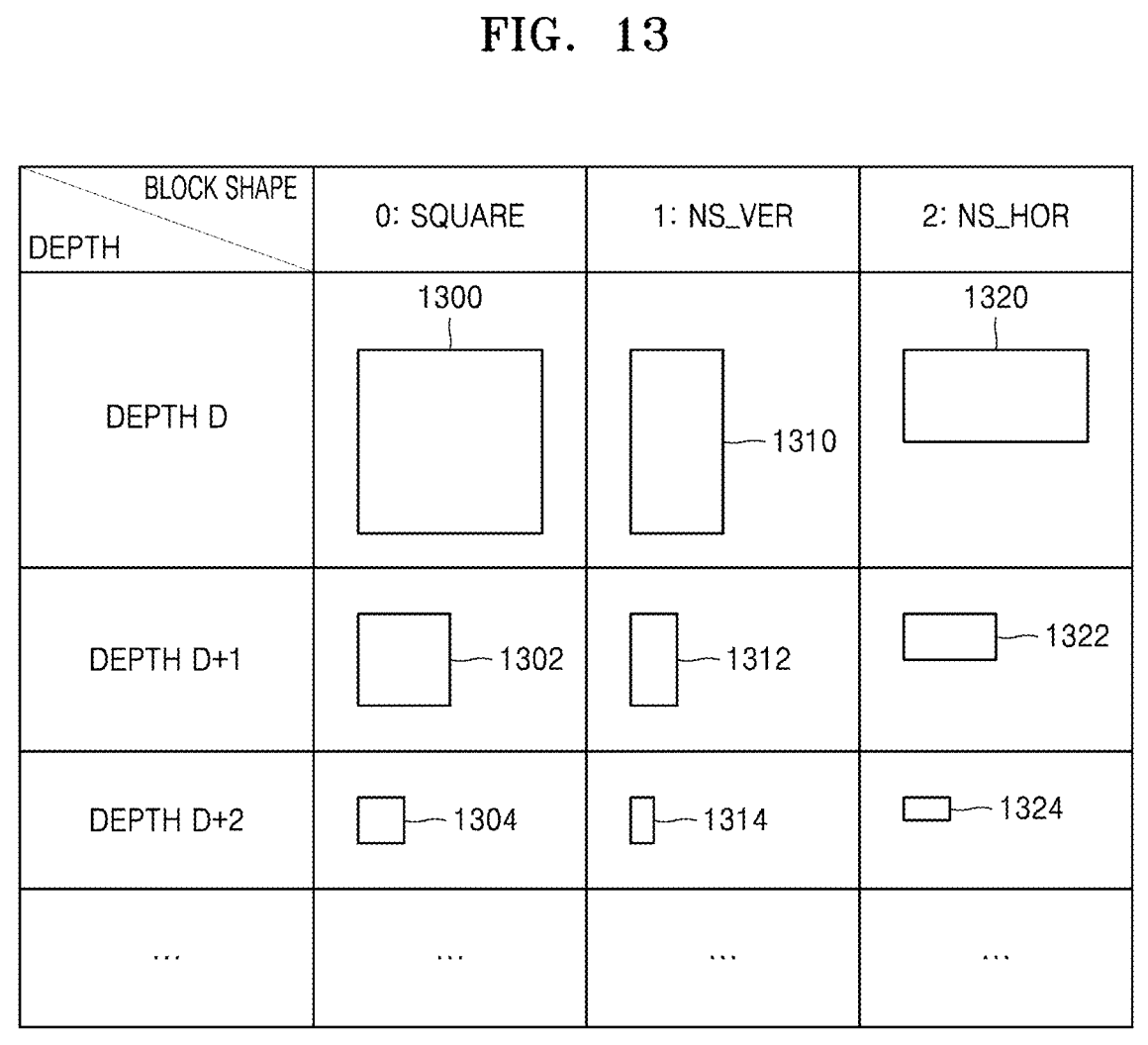

FIG. 13 illustrates a process of determining a depth of a coding unit as a shape and a size of the coding unit change, when the coding unit is recursively split such that a plurality of coding units are determined, according to an embodiment.

According to an embodiment, the image decoding device 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding device 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding device 100 may determine a second coding unit 1302 and a third coding unit 1304 of lower depths by splitting a square first coding unit 1300 based on block shape information indicating a square shape (for example the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding device 100 may determine a second coding unit 1312 or 1322 and a third coding unit 1314 or 1324 of lower depths by splitting a non-square first coding unit 1310 or 1320 based on block shape information indicating a non-square shape (for example the block shape information may be expressed as '1: NS_VER' indicating a non-square shape, a height of which is longer than a width, or as '2: NS_HOR' indicating a non-square shape, a width of which is longer than a height).

The image decoding device 100 may determine a second coding unit 1302, 1312, or 1322 by splitting at least one of a width and height of the first coding unit 1310 having a size of N×2N. That is, the image decoding device 100 may determine the second coding unit 1302 having a size of N×N or the second coding unit 1322 having a size of N×N/2 by splitting the first coding unit 1310 in a horizontal direction, or may determine the second coding unit 1312 having a size of N/4×N by splitting the first coding unit 1310 in horizontal and vertical directions.

According to an embodiment, the image decoding device 100 may determine the second coding unit 1302, 1312, or 1322 by splitting at least one of a width and height of the first coding unit 1320 having a size of 2N×N. That is, the image decoding device 100 may determine the second coding unit 1302 having a size of N×N or the second coding unit 1312 having a size of N/4×N by splitting the first coding unit 1320 in a vertical direction, or may determine the second coding unit 1322 having a size of N×N/2 by splitting the first coding unit 1320 in horizontal and vertical directions.

According to an embodiment, the image decoding device 100 may determine a third coding unit 1304, 1314, or 1324 by splitting at least one of a width and height of the second coding unit 1302 having a size of N×N. That is, the image decoding device 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding device 100 may determine the third coding unit 1304, 1314, or 1324 by splitting at least one of a width and height of the second coding unit 1312 having a size of N/2×N. That is, the image decoding device 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding device 100 may determine the third coding unit 1304, 1314, or 1324 by splitting at least one of a width and height of the second coding unit 1322 having a size of N×N/2. That is, the image decoding device 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding device 100 may split the square coding unit 1300, 1302, or 1304 in a horizontal or vertical direction. For example, the image decoding device 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
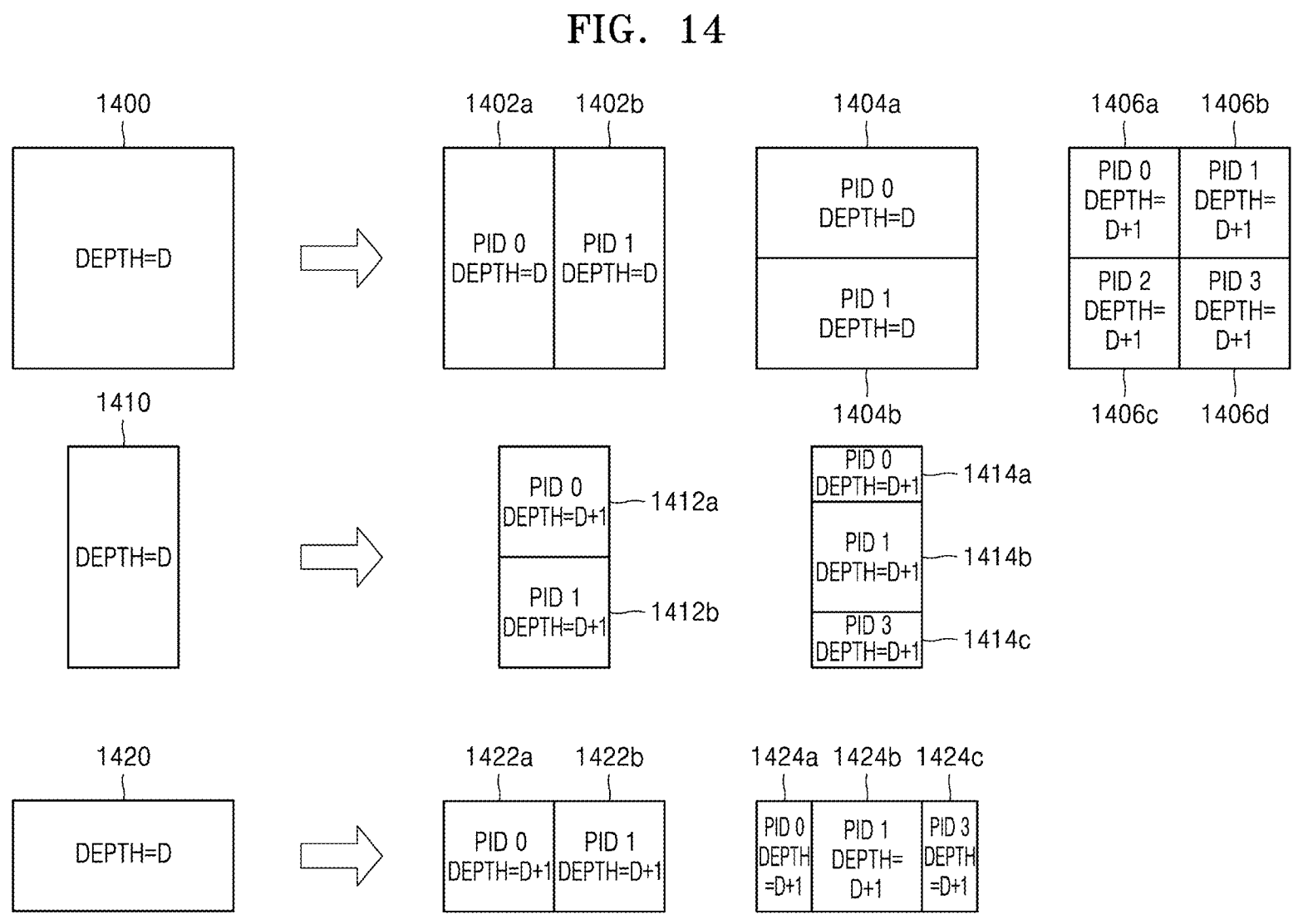

FIG. 14 illustrates depths that are determinable based on shapes and sizes of coding units, and part indexes (PIDs) that are for distinguishing the coding units, according to an embodiment.

According to an embodiment, the image decoding device 100 may determine various-shape second coding units by splitting a square first coding unit 1400. Referring to FIG. 14, the image decoding device 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding device 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, for example D. However, when the image decoding device 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding device 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding device 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding device 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding device 100 may determine depths of coding units split from the first coding unit 1420 having a non-square shape, a width of which is longer than a height, by using the above-described method of determining depths of coding units split from the first coding unit 1410.

According to an embodiment, the image decoding device 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding device 100 may determine whether an odd number of split coding units do not have equal sizes, based on whether discontinuity is present in PIDs for identifying the split coding units.

According to an embodiment, the image decoding device 100 may determine whether to use a specific splitting method, based on PID values for identifying a plurality of coding units determined by splitting a current coding unit. Referring to FIG. 14, the image decoding device 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding device 100 may use PIDs indicating respective coding units in order to identify the respective coding units. According to an embodiment, the PID may be obtained from a sample at a predetermined location of each coding unit (for example an upper-left sample).

According to an embodiment, the image decoding device 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding device 100 may split the first coding unit 1410 into three coding units 1414*a*, 1414*b*, and 1414*c*. The image decoding device 100 may assign a PID to each of the three coding units 1414*a*, 1414*b*, and 1414*c*. The image decoding device 100 may compare PIDs of an odd number of split coding units to determine a coding unit at a center location from among the coding units. The image decoding device 100 may determine the coding unit 1414*b* having a PID corresponding to a middle value among the PIDs of the coding units, as the coding unit at the center location from among the coding units determined by splitting the first coding unit 1410. According to an embodiment, the image decoding device 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding device 100 may determine that a coding unit is split into a plurality of coding units including a coding unit having a size different from that of the other coding units. According to an embodiment, when the split shape mode information indicates to split a coding unit into an odd number of coding units, the image decoding device 100 may split a current coding unit in such a manner that a coding unit of a predetermined location among an odd number of coding units (for example a coding unit of a center location) has a size different from that of the other coding units. In this case, the image decoding device 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding device 100 may use a predetermined data unit where a coding unit starts to be recursively split.

Figure 15:
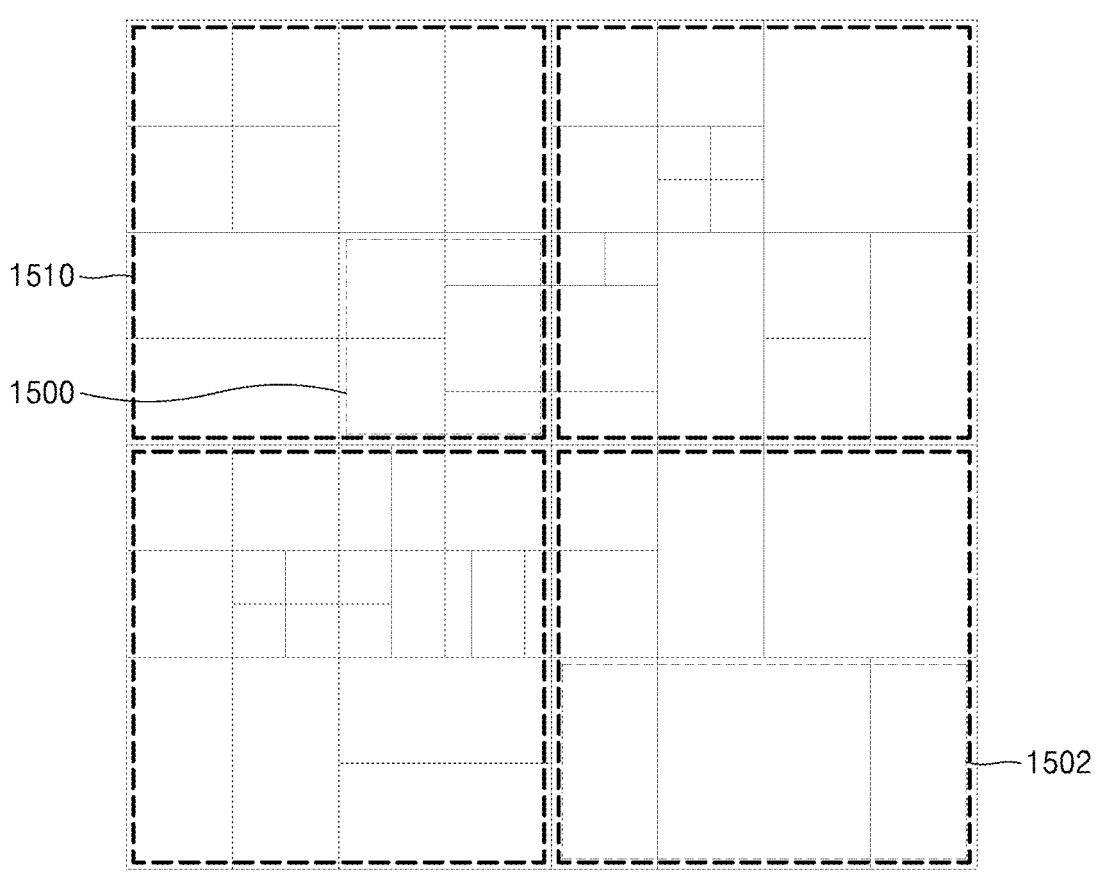
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 100 may split the current picture into a plurality of reference data units. According to an embodiment, the image decoding device 100 may split the plurality of reference data units, which are split from the current picture, by using the split shape mode information of each reference data unit. The operation of splitting the reference data unit may correspond to a splitting operation using a quadtree structure.

According to an embodiment, the image decoding device 100 may predetermine the minimum size allowed for the reference data units included in the current picture. Accordingly, the image decoding device 100 may determine various reference data units having sizes equal to or greater than the minimum size, and may determine one or more coding units by using the split shape mode information with reference to the determined reference data unit.

Referring to FIG. 15, the image decoding device 100 may use a square reference coding unit 1500 or a non-square reference coding unit 1502. According to an embodiment, the shape and size of reference coding units may be determined based on various data units capable of including one or more reference coding units (for example sequences, pictures, slices, slice segments, tiles, tile groups, largest coding units, or the like).

According to an embodiment, the receiver 110 of the image decoding device 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding device 100 may use a PID for identifying the size and shape of reference coding units, to determine the size and shape of reference coding units according to some data units predetermined based on a predetermined condition. That is, the receiver 110 may obtain, from the bitstream, only the PID for identifying the size and shape of reference coding units with respect to each slice, slice segment, tile, tile group, or largest coding unit which is a data unit satisfying a predetermined condition (for example a data unit having a size equal to or smaller than a slice) among the various data units (for example sequences, pictures, slices, slice segments, tiles, tile groups, largest coding units, or the like). The image decoding device 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding device 100 may determine at least one of the size and shape of reference coding units included in a data unit serving as a unit for obtaining the PID, by selecting the predetermined at least one of the size and shape of reference coding units based on the PID.

According to an embodiment, the image decoding device 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 100 may determine the reference coding units by splitting the largest coding unit n times based on a quadtree structure, and may split the reference coding unit based on at least one of the block shape information and the split shape mode information according to various embodiments.

According to an embodiment, the image decoding device 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding device 100 may use the split shape mode information included in a sequence parameter set, a picture parameter set, a video parameter set, a slice header, a slice segment header, a tile header, or a tile group header. Furthermore, the image decoding device 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding device 100 may determine a split rule of an image. The split rule may be predetermined between the image decoding device 100 and the image encoding device 2200. The image decoding device 100 may determine the split rule of the image, based on information obtained from a bitstream. The image decoding device 100 may determine the split rule based on the information obtained from at least one of a sequence parameter set, a picture parameter set, a video parameter set, a slice header, a slice segment header, a tile header, and a tile group header. The image decoding device 100 may determine the split rule differently according to frames, slices, tiles, temporal layers, largest coding units, or coding units.

The image decoding device 100 may determine the split rule based on a block shape of a coding unit. The block shape may include a size, shape, a ratio of width and height, and a direction of the coding unit. The image decoding device 100 may predetermine to determine the split rule based on the block shape of the coding unit. However, the embodiment is not limited thereto. The image decoding device 100 may determine the split rule based on the information obtained from the received bitstream.

The shape of the coding unit may include a square and a non-square. When the lengths of the width and height of the coding unit are the same, the image decoding device 100 may determine the shape of the coding unit to be a square. Also, when the lengths of the width and height of the coding unit are not the same, the image decoding device 100 may determine the shape of the coding unit to be a non-square.

The size of the coding unit may include various sizes, such as 4×4, 8×4, 4×8, 8×8, 16×4, 16×8, and to 256×256. The size of the coding unit may be classified or determined based on the length of a long side of the coding unit, the length of a short side, or the area. The image decoding device 100 may apply the same split rule to coding units classified as the same group. For example, the image decoding device 100 may classify coding units having the same lengths of the long sides as having the same size. Also, the image decoding device 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding device 100 may adaptively determine the split rule based on the size of the coding unit. The image decoding device 100 may differently determine an allowable split shape mode based on the size of the coding unit. For example, the image decoding device 100 may determine whether splitting is allowed based on the size of the coding unit. The image decoding device 100 may determine a split direction according to the size of the coding unit. The image decoding device 100 may determine an allowable split type according to the size of the coding unit.

The split rule determined based on the size of the coding unit may be a split rule predetermined in the image decoding device 100. Also, the image decoding device 100 may determine the split rule based on the information obtained from the bitstream.

The image decoding device 100 may adaptively determine the split rule based on a location of the coding unit. The image decoding device 100 may adaptively determine the split rule based on the location of the coding unit in the image.

Also, the image decoding device 100 may determine the split rule such that coding units generated via different splitting paths do not have the same block shape. However, embodiments are not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 16:
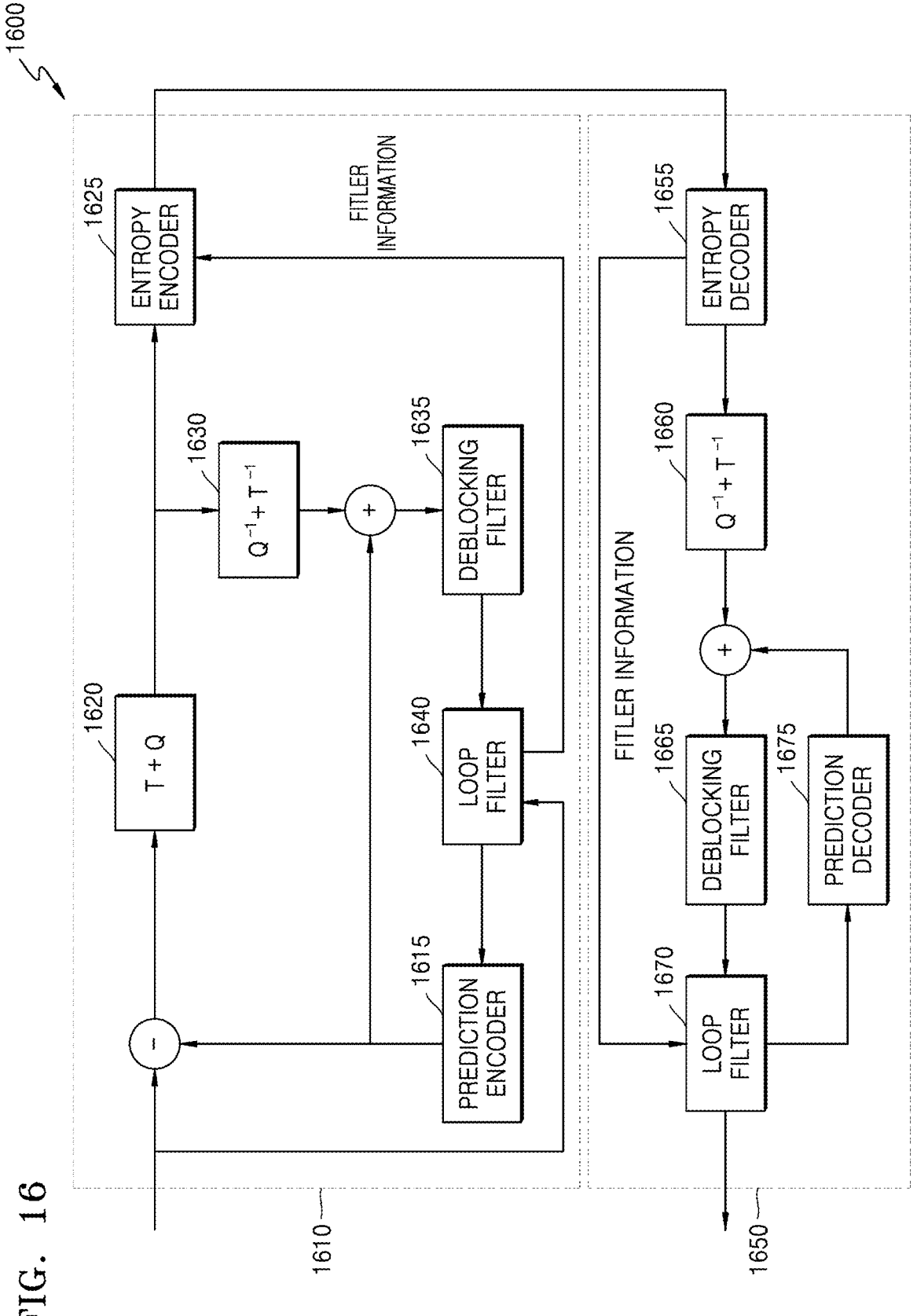
FIG. 16 is a block diagram of an image encoding and decoding system.

FIG. 16 is a block diagram of an image encoding and decoding system.

An encoding end 1610 of an image encoding and decoding system 1600 transmits an encoded bitstream of an image and a decoding end 1650 outputs a reconstructed image by receiving and decoding the bitstream. Here, the decoding end 1650 may have a similar configuration as the image decoding device 100.

At the encoding end 1610, a prediction encoder 1615 outputs a reference image via inter-prediction and intra-prediction, and a transformer and quantizer 1616 quantizes residual data between the reference picture and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when a reference image and residual data output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675 as a reference image for a next original image.

The loop filter 1640 of the encoding end 1610 performs loop filtering by using filter information input according to a user input or system setting. The filter information used by the loop filter 1640 is output to the entropy encoder 1610 and transmitted to the decoding end 1650 together with the encoded image data. The loop filter 1670 of the decoding end 1650 may perform loop filtering based on the filter information input from the decoding end 1650.

Hereinafter, a method and device for encoding or decoding chroma components of a picture, according to an embodiment disclosed in the present specification, will be described with reference to FIGS. 17 to 20.

Figure 17:
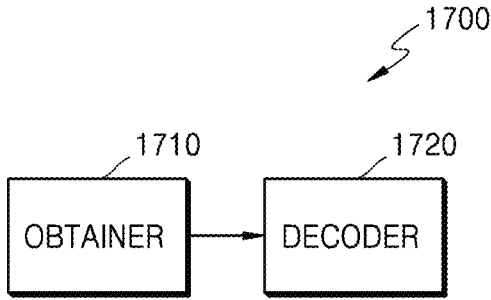
FIG. 17 is a detailed block diagram of a video decoding apparatus according to an embodiment.

FIG. 17 is a block diagram of a video decoding apparatus according to an embodiment.

Referring to FIG. 17, a video decoding apparatus 1700 according to an embodiment may include an obtainer 1710 and a decoder 1720.

The video decoding apparatus 1700 according to an embodiment may include a central processor for controlling the obtainer 1710 and the decoder 1720. In embodiments, the obtainer 1710 and the decoder 1720 may operate by their own processors, and the processors may systematically operate with each other to operate the video decoding apparatus 1700. In embodiments, the obtainer 1710 and the decoder 1720 may be controlled according to control by an external processor of the video decoding apparatus 1700.

The video decoding apparatus 1700 may include one or more data storages storing input/output data of the obtainer 1710 and the decoder 1720. The video decoding apparatus 1700 may include a memory controller for controlling data input and output to and from the data storage.

The video decoding apparatus 1700 may perform an image decoding operation including prediction by connectively operating with an internal video decoding processor or an external video decoding processor in order to reconstruct an image via image decoding. The internal video decoding processor of the video decoding apparatus 1700 according to an embodiment may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding device 100 described above. For example, the obtainer 1710 may be included in the receiver 110 of the image decoding device 100 of FIG. 1, and the decoder 1720 may be included in the decoder 120 of the image decoding device 100.

The video decoding device 1700 may obtain a bitstream generated as a result of encoding on an image, and decode information about a prediction type of a coding unit based on information included in the bitstream. For example, the information about the prediction type may represent one of an intra prediction type and an inter prediction type. The coding unit may correspond to a block split and generated from the image according to a tree structure.

The obtainer 1710 may determine the current block based on block shape information and/or information about a split shape mode, which are included in at least one of a sequence parameter set, a picture parameter set, a video parameter set, a slice header, and a slice segment header. Further, the obtainer 1710 may obtain a syntax element corresponding to block type information or information about a split type mode from a bitstream for each largest coding unit, each reference coding unit, or each processing block, and use the syntax element to determine a current block.

The obtainer 1710 according to an embodiment may obtain coded block flag (CBF) information for a Cr component of the current block and CBF information of a Cb component of the current block, from the bitstream. The current block may be a block generated from the coding unit, and may be a transform unit for dequantization and inverse-transformation.

The CBF information for the Cr component (which may be, for example, referred to as 'Cr CBF information') may represent whether the current block includes a Cr component of which a transform coefficient level is not 0. For example, when the Cr CBF information is 0, it may represent that the current block does not include a Cr component of which a transform coefficient level is not 0, and, when the Cr CBF information is 1, it may represent that the current block includes a Cr component of which a transform coefficient level is not 0. Similarly, the CBF for the Cb component (which may be, for example, referred to as 'Cb CBF information') may represent whether the current block includes a Cb component of which a transform coefficient level is not 0. For example, when the Cb CBF information is 0, it may represent that the current block does not include a Cb component of which a transform coefficient level is not 0, and, when the Cb CBF information is 1, it may represent that the current block includes a Cb component of which a transform coefficient level is not 0.

Generally, when CBF information for a current transform block is 1, transform coefficient levels may be obtained from a bitstream, and the decoder 1720 may reconstruct residual components of a luma component by using the obtained transform coefficient levels.

The video decoding device 1700 according to an embodiment may obtain transform coefficient levels of a Cb component and transform coefficient levels of a Cr component, individually, from a bitstream, or obtain one kind of chroma transform coefficient levels from a bitstream, to reconstruct a residual sample of the Cb component and a residual sample of the Cr component.

Hereinafter, an embodiment of using a chroma joint residual sample as one kind of a chroma transform coefficient level will be described.

The obtainer 1710 according to an embodiment may obtain a chroma joint residual sample of a current block from a bitstream. The chroma joint residual sample of the current block may be a sample value determined by using a residual sample value of a Cb component of the current block and a residual sample value of a Cr component of the current block. Accordingly, only one chroma sample value may be obtained from the bitstream to represent a residual sample value of a Cb component and a residual sample value of a Cr component corresponding to the residual sample value of the Cb component. When a size of the current block is a luma 8×8 block and a chroma block 4×4, a total 16 of chroma joint residual samples may be obtained from the bitstream.

The decoder 1720 according to an embodiment may determine a weight of the residual sample of the Cr component and a weight of the residual sample of the Cb component, based on a prediction type of a coding unit, Cr CBF information, and Cb CBF information. The decoder 1720 may reconstruct the residual sample of the Cr component by using the chroma joint residual sample of the current block and the weight of the residual sample of the Cr component. Similarly, the decoder 1720 may reconstruct the residual sample of the Cb component by using the chroma joint residual sample of the current block and the weight of the residual sample of the Cb component.

First, the obtainer 1710 according to an embodiment may obtain chroma joint information representing whether only one chroma sample value is encoded to represent a residual sample value of a Cb component and a residual sample value of a Cr component, corresponding to the residual sample value of the Cb component, from a bitstream.

For example, when the chroma joint information represents 1, it may be interpreted that one chroma sample is encoded in a current block. In this case, the obtainer 1710 may obtain a chroma sample value from the bitstream, and the decoder 1720 may reconstruct a residual sample value of a Cb component and a residual sample value of a Cr component corresponding to the residual sample value of the Cb component by using the obtained chroma sample value. In this case, the decoder 1720 may determine a weight of the residual sample of the Cr component and a weight of the residual sample of the Cb component, based on a prediction type of a coding unit, CBF information for the Cr component, and CBF information for the Cb component. More specifically, when the chroma joint information represents that a chroma sample is encoded, the decoder 1720 according to an embodiment may determine a weight of a residual sample of a Cr component and a weight of a residual sample of a Cb component, based on a prediction type of a coding unit, Cr CBF information, and Cb CBF information.

According to an embodiment, when the prediction type of the coding unit is an intra prediction mode, the decoder 1720 may select a joint mode from among a plurality of joint modes based on the Cr CBF information and the Cb CBF information, and determine a weight of a residual sample of a Cr component and a weight of a residual sample of a Cb component according to the selected joint mode.

According to an embodiment, when the prediction type of the coding unit is an inter prediction mode, the decoder 1720 may determine a weight of a residual sample of a Cr component and a weight of a residual sample of a Cb component, included in an allowed joint mode.

According to a combination of the weight of the residual sample of the Cr component and the weight of the residual sample of the Cb component, determined according to the prediction type, Cr CBF information, and Cb CBF information, the decoder 1720 may reconstruct the residual sample of the Cr component by using the chroma joint residual sample of the current block and the weight of the residual sample of the Cr component, and reconstruct the residual sample of the Cb component by using the chroma joint residual sample of the current block and the weight of the residual sample of the Cb component.

According to an embodiment, when the chroma joint information represents 0, the obtainer 1710 may obtain transform coefficient levels of a Cb component and transform coefficient levels of a Cr component, individually, from the bitstream. The obtainer 1710 may obtain transform coefficient levels for a transform block of a Cb component from the bitstream, and the decoder 1720 may reconstruct residual samples of the Cb component by using the obtained transform coefficient levels. Likewise, the obtainer 1710 may obtain transform coefficient levels for a transform block of a Cr component from the bitstream, and the decoder 1720 may reconstruct residual samples of the Cr component by using the obtained transform coefficient levels.

According to an embodiment, the number of joint modes corresponding to combinations of weights of a residual sample of a Cr component and weights of a residual sample of a Cb component may be set, differently, depending on whether the prediction type of the coding unit is the intra prediction mode or the inter prediction mode. When the prediction type of the coding unit is the intra prediction mode, the decoder 1720 according to an embodiment may select one from among the plurality of joint modes based on CBF information for a Cr component and CBF information for a Cb component, and determine a weight of a residual sample of the Cr component and a weight of a residual sample of the Cb component according to the selected joint mode. The decoder 1720 according to an embodiment may determine the weight of the residual sample of the Cr component and the weight of the residual sample of the Cb component according to a joint mode allowed when the prediction type of the coding unit is the inter prediction mode.

The decoder 1720 according to an embodiment may determine a joint mode including the weight of the residual sample of the Cr component and the residual sample of the Cb component, based on the chroma joint information, the CBF information for the Cr component, and the CBF information for the Cb component, and determine a quantization parameter for the current block based on the joint mode.

The decoder 1720 according to an embodiment may determine a reference block in a reference picture by using a motion vector of the current block, and determine prediction samples corresponding to the current block from reference samples included in the reference block.

When a prediction mode of the current block is not a skip mode, the video decoding device 1700 may perform dequantization and inverse-transformation on transform coefficients of the current block, obtained from the bitstream, to obtain residual samples. The decoder 1720 may combine the prediction samples of the current block with the residual samples of the current block to determine reconstructed samples of the current block.

Hereinafter, a video decoding method for decoding residual samples of a chroma component will be described with reference to FIG. 18, below.

Figure 18:
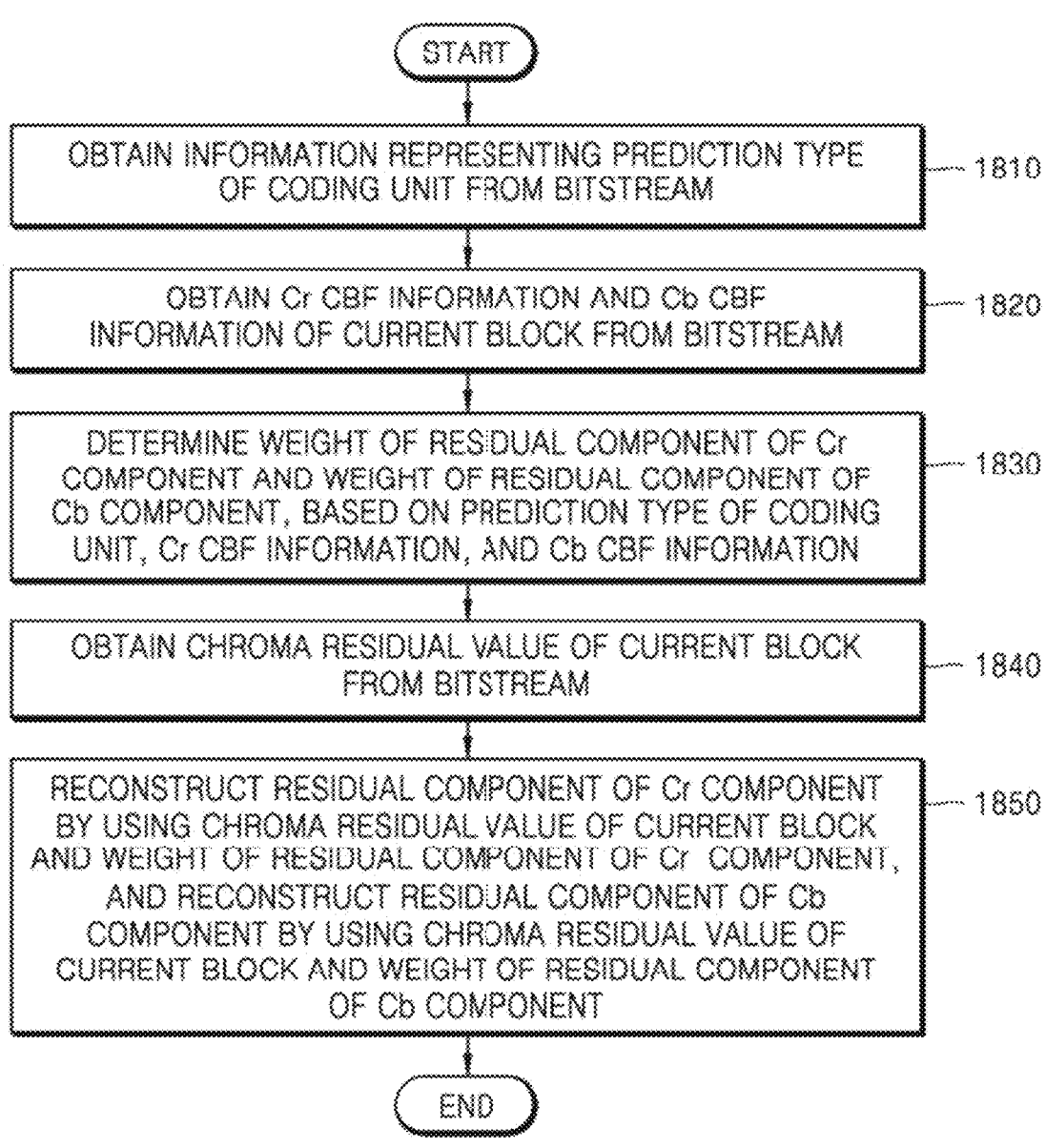
FIG. 18 is a flowchart of a video decoding method according to an embodiment.

FIG. 18 illustrates a flowchart of a video decoding method according to an embodiment.

In operation 1810, the obtainer 1710 may obtain information representing a prediction type of a coding unit including a current block, from a bitstream.

In operation 1820, the obtainer 1710 may obtain Cr CBF information and Cb CBF information of the current block from the bitstream.

In operation 1830, the decoder 1720 may determine a weight of a residual sample of a Cr component and a weight of a residual sample of a Cb component, based on the prediction type of the coding unit, the Cr CBF information, and the Cb CBF information.

The obtainer 1710 according to an embodiment may obtain, from the bitstream, chroma joint information representing whether a chroma sample is encoded to represent a residual sample of a Cb component and a residual sample of a Cr component, corresponding to the residual sample of the Cb component, in the current block. When the chroma joint information represents that a chroma sample is encoded in the current block, the decoder 1720 may determine a weight of a residual sample of a Cr component and a weight of a residual component of a Cb component, based on the prediction type of the coding unit, the Cr CBF information, and the Cb CBF information.

For example, one among combinations of weights of a residual sample of a Cr component and weights of a residual sample of a Cb component may be selected based on the prediction type of the coding unit, the Cr CBF information, and the Cb CBF information.

More specifically, when the prediction type of the coding unit is an intra prediction mode, the decoder 1720 may select a joint mode from among a plurality of joint modes based on the Cr CBF information and the Cb CBF information, and determine a weight of a residual sample of a Cr component and a weight of a residual sample of a Cb component according to the selected joint mode. Meanwhile, when the prediction type of the coding unit is an inter prediction mode, the decoder 1720 may determine a weight of a residual sample of a Cr component and a weight of a residual sample of a Cb component, corresponding to an allowed joint mode.

According to an embodiment, the weight of the residual sample of the Cr component may be $-\frac{1}{2}$, and the weight of the residual sample of the Cb component may be 1. According to another embodiment, the weight of the residual sample of the Cr component may be $-1$, and the weight of the residual sample of the Cb component may be 1. According to still another embodiment, the weight of the residual sample of the Cr component may be 1, and the weight of the residual sample of the Cb component may be $-\frac{1}{2}$.

As another example, combinations of weights of a residual sample of a Cr component and weights of a residual sample of a Cb component may change according to joint modes. For example, three combinations of weights of a residual sample of a Cr component and weights of a residual sample of a Cb component may be set to $\{-\frac{1}{2}, 1\}$, $\{-1, 1\}$, and $\{1, -\frac{1}{2}\}$ according to three joint modes. A weight of a residual sample of a Cr component and a weight of a residual sample of a Cb component may be determined according to a mode selected from among the three joint modes.

In operation 1840, the obtainer 1710 may obtain a chroma joint residual sample of the current block from the bitstream.

In operation 1850, the decoder 1720 may reconstruct a residual sample of a Cr component by using the chroma joint residual sample of the current block and the weight of the residual sample of the Cr component. The decoder 1720 may reconstruct a residual sample of a Cb component by using the chroma joint residual sample of the current block and the weight of the residual sample of the Cb component.

More specifically, a result value of a weighted sum obtained by applying the weight of the residual sample of the Cr component to the chroma joint residual sample of the current block may be determined to be the residual sample of the Cr component. Similarly, a result value of a weighted sum obtained by applying the weight of the residual sample of the Cb component to the chroma joint residual sample of the current block may be determined to be the residual sample of the Cb component.

The decoder 1720 according to an embodiment may reconstruct the current block by using the motion vector of the current block. The decoder 1720 may determine a reference block in a reference picture by using the motion vector of the current block, and may determine prediction samples corresponding to the current block from among reference samples included in the reference block. The decoder 1720 may add the prediction samples of the current block and residual samples of the current block in order to determine reconstructed samples of the current block in a prediction mode other than the skip mode. When the residual samples are not available as in the skip mode, reconstructed samples of the current block may be determined only from the prediction samples of the current block. By reconstructing the current block, a current picture including the current block may be reconstructed.

The decoder 1720 according to an embodiment may determine a joint mode using the weight of the residual sample of the Cr component and the weight of the residual sample of the Cb component, based on the chroma joint information, the Cr CBF information, and the Cb CBF information, and determine a quantization mode for the current block based on the determined joint mode. For example, when a specific joint mode is determined, a quantization parameter for chroma components may be determined individually. The decoder 1720 may perform dequantization on transform coefficients of chroma joint residual samples of the current block by using the quantization parameter for the chroma components. The decoder 1720 may reconstruct chroma joint residual samples by performing dequantization and inverse-transformation on the transform coefficients, and reconstruct residual samples of the Cr component and residual samples of the Cb component by applying the weight of the residual sample of the Cr component and the weight of the residual sample of the Cb component to the chroma joint residual samples.

Hereinafter, a video encoding device for splitting a picture into tiles and performing encoding on each tile will be described with reference to FIG. 19, below.

Figure 19:
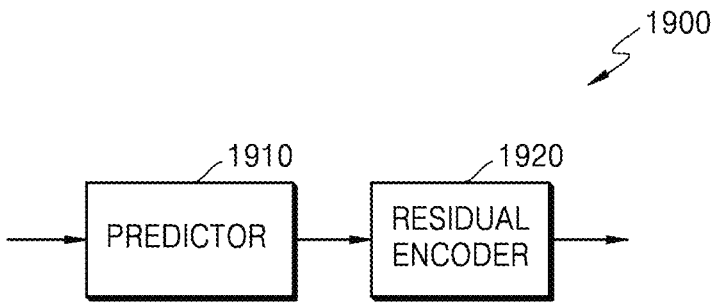
FIG. 19 is a block diagram of a video encoding apparatus according to an embodiment.

FIG. 19 illustrates a block diagram of a video encoding device according to an embodiment.

A video encoding device 1900 according to an embodiment may include a predictor 1910 and a residual encoder 1920.

The video encoding device 1900 may encode motion information determined by performing inter prediction, and output a result of the encoding in the form of a bitstream.

The video encoding device 1900 according to an embodiment may include a central processor for controlling the predictor 1910 and the residual encoder 1920. Or, the predictor 1910 and the residual encoder 1920 may operate by their own processors, and the processors may operate mutually organically so that the video encoding device 1900 operates in totality. Or, the predictor 1910 and the residual encoder 1920 may be controlled according to a control of an external processor of the video encoding device 1900.

The video encoding device 1900 may include one or more data storage devices in which input/output data of the predictor 1910 and the residual encoder 1920 is stored. The video encoding device 1900 may include a memory controller for controlling data inputs/outputs of the data storage devices.

The video encoding apparatus 1900 may perform an image encoding operation including prediction by connectively operating with an internal video encoding processor or an external video encoding processor in order to encode an image. The internal video encoding processor of the video encoding apparatus 1900 according to an embodiment may perform a basic image encoding operation in a manner that not only a separate processor but also an image encoding processing module included in a central processing apparatus or a graphic processing apparatus may perform the basic image encoding operation.

The predictor 1910 according to an embodiment may determine a prediction type of a coding unit including a current block.

The predictor 1910 may determine samples of a reference block indicated by a motion vector of the current block to be prediction samples of the current block. The residual encoder 1920 may determine residual samples which are differences between original samples of the current block and the prediction samples. The residual encoder 1920 may perform transformation and quantization on the residual samples of the current block to generate transform coefficients, and encode the transform coefficients.

However, the video encoding device 1900 according to an embodiment may determine a residual sample of a Cb component and a residual sample of a Cr component differently from actual residual samples being differences between the original samples and the prediction samples, and encode the residual sample of the Cb component and the residual sample of the Cr component. The residual encoder 1920 may encode a chroma joint residual sample, instead of an actual value of the residual sample of the Cb component and an actual value of the residual sample of the Cr component.

The residual encoder 1920 according to an embodiment may determine Cr CBF information and Cb CBF information of the current block. The residual encoder 1920 according to an embodiment may determine a weight of a residual sample of a Cr component and a weight of a residual sample of a Cb component, based on the prediction type of the coding unit, the Cr CBF information, and the Cb CBF information.

The residual encoder 1920 according to an embodiment may generate a chroma joint residual sample of the current block. Although the video encoding device 1900 knows an actual residual sample of a Cb component and an actual residual sample of a Cr component, the video encoding device 1900 may determine a chroma joint residual sample to be encoded, for coding efficiency. The residual encoder 1920 may determine the chroma joint residual sample by using the actual value of the residual sample of the Cb component and the actual value of the residual sample of the Cr component, in consideration that the video decoding device 1700 will reconstruct the residual sample of the Cr component by using the chroma joint residual sample of the current block and the weight of the residual sample of the Cr component and reconstruct the residual sample of the Cb component by using the chroma joint residual sample of the current block and the weight of the residual sample of the Cb component.

Also, the residual encoder 1920 according to an embodiment may determine the weight of the residual sample of the Cr component and the weight of the residual sample of the Cb component, based on the prediction type of the coding unit, the Cr CBF information, and the Cb CBF information.

The residual encoder 1920 according to an embodiment may set the number of joint modes corresponding to combinations of weights of a residual sample of a Cr component and weights of a residual sample of a Cb component, differently, depending on whether the prediction type of the coding unit is an intra prediction mode or an inter prediction mode.

When the prediction type of the coding unit is the intra prediction mode, the residual encoder 1920 may select one from among a plurality of joint modes based on the CBF information for the Cr component and the CBF information for the Cb component, and determine a weight of a residual sample of a Cr component and a weight of a residual sample of a Cb component according to the selected joint mode. The weight of the residual sample of the Cr component and the weight of the residual sample of the Cb component may be determined according to a joint mode allowed when the prediction type of the coding unit is the inter prediction mode.

Also, the video encoding device 1900 may generate chroma joint information representing whether a chroma sample is encoded to represent a residual sample of a Cb component and a residual sample of a Cr component, corresponding to the residual sample of the Cb component, in the current block.

Hereinafter, a process of performing video encoding on residual samples of a chroma component in the video encoding device 1900 will be described with reference to FIG. 20, below.

Figure 20:
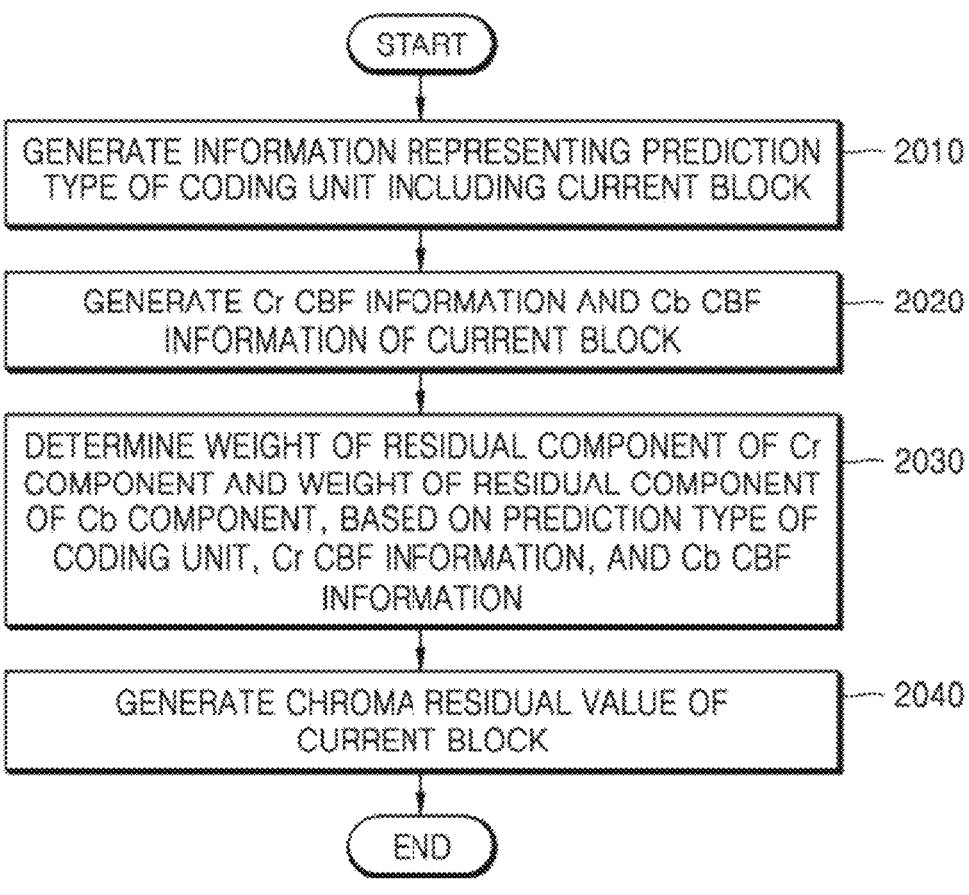
FIG. 20 is a flowchart of a video encoding method according to an embodiment.

FIG. 20 illustrates a flowchart of a video encoding method according to an embodiment.

In operation 2010, the predictor 1910 may determine a prediction type of a coding unit including a current block. The video encoding device 1900 may encode prediction type information representing whether the prediction type of the coding unit including the current block is an inter prediction mode or an intra prediction mode.

In operation 2020, the residual encoder 1920 may determine Cr CBF information and Cb CBF information of the current block. For example, the residual encoder 1920 may encode the Cr CBF information in order to represent whether the current block includes a Cr component of which a transform coefficient level is not 0. For example, when the current block does not include a Cr component of which a transform coefficient level is not 0, the residual encoder 1920 may encode the Cr CBF information such that the Cr CBF information represents 0. When the current block includes a Cr component of which a transform coefficient level is not 0, the residual encoder 1920 may encode the Cr CBF information such that the Cr CBF information represents 1. Similarly, the residual encoder 1920 may encode the Cb CBF information in order to represent whether the current block includes a Cb component of which a transform coefficient level is not 0. For example, when the current block does not include a Cb component of which a transform coefficient level is not 0, the residual encoder 1920 may encode the Cb CBF information such that the Cb CBF information represents 0. When the current block includes a Cb component of which a transform coefficient level is not 0, the residual encoder 1920 may encode the Cb CBF information such that the Cb CBF information represents 1.

In operation 2030, the residual encoder 1920 may determine a weight of a residual sample of a Cr component and a weight of a residual sample of a Cb component, based on the prediction type of the coding unit, the Cr CBF information, and the Cb CBF information.

According to an embodiment, the weight of the residual sample of the Cr component may be $-\frac{1}{2}$, and the weight of the residual sample of the Cb component may be 1. According to another embodiment, the weight of the residual sample of the Cr component may be $-1$, and the weight of the residual sample of the Cb component may be 1. According to still another embodiment, the weight of the residual sample of the Cr component may be 1, and the weight of the residual sample of the Cb component may be $-\frac{1}{2}$.

When the prediction type of the coding unit is the intra prediction mode, the residual encoder 1920 may select one from among a plurality of joint modes based on CBF information for a Cr component and CBF information for a Cb component, and determine a weight of a residual sample of a Cr component and a weight of a residual sample of a Cb component according to the selected joint mode. The weight of the residual sample of the Cr component and the weight of the residual sample of the Cb component may be determined according to a joint mode allowed when the prediction type of the coding unit is the inter prediction mode.

As another example, a plurality of combinations of weights of a residual sample of a Cr component and weights of a residual sample of a Cb component may be provided, and a combination of the weight combinations may be selected for each of the plurality of joint modes. For example, as a combination of a weight of a residual sample of a Cr component and a weight of a residual sample of a Cb component, a combination of $\{-\frac{1}{2}, 1\}$, $\{-1, 1\}$, and $\{1, -\frac{1}{2}\}$ may be selected for each of the joint modes. A weight of a residual sample of a Cr component and a weight of a residual sample of a Cb component may be determined according to a mode selected from among three joint modes.

Also, as a detailed example, when the prediction type of the coding unit is the intra prediction mode, the residual encoder 1920 may select a joint mode from among the plurality of joint modes based on Cr CBF information and Cb CBF information, and determine a weight of a residual sample of a Cr component and a weight of a residual sample of a Cb component according to the selected joint mode. Meanwhile, when the prediction type of the coding unit is the inter prediction mode, the residual encoder 1920 may determine a weight of a residual sample of a Cr component and a weight of a residual sample of a Cb component, according to an allowed joint mode.

In operation 2040, the residual encoder 1920 may generate a chroma joint residual sample of the current block. The residual encoder 1920 according to an embodiment may encode a chroma joint residual sample, instead of an actual value of a residual sample of a Cb component and an actual value of a residual sample of a Cr component. When a size of the current block is a luma 8×8 block and a chroma block 4×4, a total 16 of chroma joint residual samples may be obtained from a bitstream.

The residual encoder 1920 may determine a chroma joint residual sample by using the actual value of the residual sample of the Cb component and the actual value of the residual sample of the Cr component, in consideration that the video decoding device 1700 will reconstruct the residual sample of the Cr component by using the chroma joint residual sample of the current block and the weight of the residual sample of the Cr component and reconstruct the residual sample of the Cb component by using the chroma joint residual sample of the current block and the weight of the residual sample of the Cb component.

The video encoding device 1900 may generate chroma joint information representing whether a chroma sample is encoded to represent a residual sample of a Cb component and a residual sample of a Cr component, corresponding to the residual sample of the Cb component, in the current block. When a chroma sample is encoded to represent a residual sample of a Cb component and a residual sample of a Cr component, corresponding to the residual sample of the Cb component, in the current block, operations 2030 and 2040 may be performed.

The residual encoder 1920 according to an embodiment may determine a joint mode using the weight of the residual sample of the Cr component and the weight of the residual sample of the Cb component, based on the chroma joint information, the Cr CBF information, and the Cb CBF information, and determine a quantization parameter for the current block based on the determined joint mode. For example, when a specific joint mode is determined, a quantization parameter for chroma components may be determined individually. The residual decoder 1920 may perform quantization on transform coefficients of the chroma joint residual samples by using the quantization parameter. The quantized transform coefficients may be encoded to syntax elements which are referred to as transform coefficient levels.

Hereinafter, a process of determining a chroma joint residual sample by using a residual sample of a Cr component and a residual sample of a Cb component, and reconstructing the residual sample of the Cr component and the residual sample of the Cb component by using the chroma joint residual sample will be described with reference to FIGS. 21 and 22.

Figure 21:
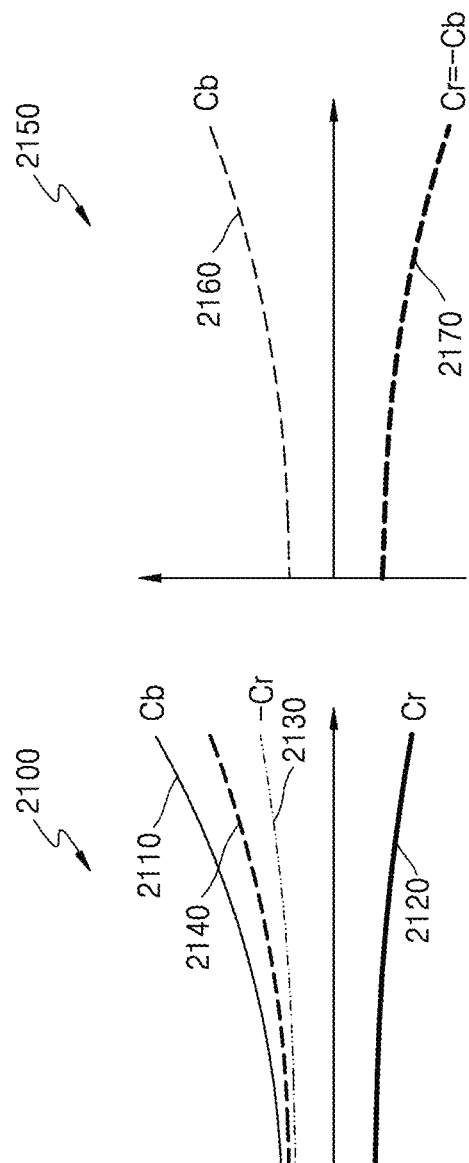
FIG. 21 illustrates a graph representing a relationship between a Cb component, a Cr component, and a chroma coding component, according to an embodiment.

FIG. 21 illustrates a graph representing relationship between a Cb component, a Cr component, and a chroma coding component, according to an embodiment.

A graph 2100 shows relationship between an actual value 2120 of a residual sample of a Cr component, an actual value 2110 of a residual sample of a Cb component, and a chroma joint residual sample 2140, in the video encoding device 1900. The video encoding device 1900 according to an embodiment may determine an average value of the actual value 2110 of the residual sample of the Cb component and a value 2130 obtained by multiplying the actual value 2120 of the residual sample of the Cr component by −1, to be the chroma joint residual sample 2140.

A graph 2200 shows relationship between the actual value 2120 of the residual sample of the Cr component, the actual value 2110 of the residual sample of the Cb component, and the chroma joint residual sample 2140, in the video decoding device 1700.

The video decoding device 1700 may determine a weight of a residual sample of a Cb component to be 1, and a weight of a residual sample of a Cr component to be −1.

Accordingly, when the obtainer 1710 obtains the chroma joint residual sample 2140, the decoder 1720 may determine the same value as the chroma joint residual sample 2140 to be a reconstructed value of a residual sample 2160 of a Cb component, and determine a value generated by multiplying the chroma joint residual sample 2140 by −1 to be a reconstructed value of a residual sample 2170 of a Cr component.

Figure 22:
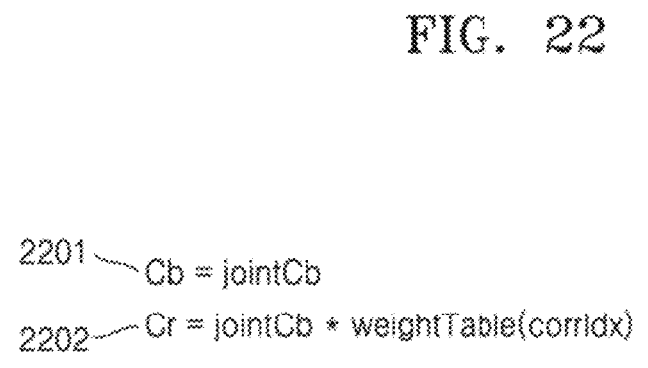

FIG. 22 represents relationships between a Cb component, a Cr component, and a chroma coding component, according to an embodiment.

In the relationships shown in FIG. 22, Cb represents a reconstructed value of a residual sample of a Cb component, and Cr represents a reconstructed value of a residual sample of a Cr component. jointCb represents a chroma joint residual sample, and weightTable(corrIdx) represents a weight of the residual sample of the Cr component.

According to a first relationship 2201, because a weight of a residual sample of a Cb component is 1, the same value as the chroma joint residual sample jointCb may be determined to be a reconstructed value Cb of the residual sample of the Cb component.

According to a second relationship 2202, because a weight of a residual sample of a Cr component is weightTable(corrIdx), a weighted sum resulting from applying the weight to the chroma joint residual sample jointCb may be determined to be a reconstructed value Cr of the residual sample of the Cr component. weightTable(corrIdx) may be a table including a plurality of weights, and a weight determined according to an index corrIdx from among the plurality of weights may be determined to be a weight of the residual sample of the Cr component. In this case, the weight of the residual sample of the Cb component may be considered to be fixed to 1.

The weights exemplified in FIGS. 21 and 22 are an embodiment, and a joint mode allowed in embodiments is not limited thereto. For example, weightTable may be {−1, 1, −2, −½, −4, ¼, . . . }. In this case, the weight of the residual sample of the Cb component may be fixed to 1, and the weight of the residual sample of the Cr component may be determined to be one of {−1, 1, −2, −½, −4, ¼, . . . }. As another example, joint modes for Cb and Cr residual samples may be set to {(1, ±½), (1, ±1), (±½, 1)}, and one of the joint modes may be determined according to a prediction type, Cb CBF, and Cr CBF.

FIG. 23 illustrates transform unit syntax according to an embodiment.

The video decoding device 1700 may obtain syntax elements tu_cbf_cb, tu_cbf_cr and tu_joint_cbcr_residual_flag from transform unit syntax 2300.

tu_cbf_cb may be a syntax element corresponding to Cb CBF information, and represent whether a current transform block includes a Cb component of which a transform coefficient level is not 0. tu_cbf_cr may be a syntax element corresponding to Cr CBF information, and represent whether a current transform block includes a Cr component of which a transform coefficient level is not 0. tu_joint_cbcr_residual_flag may be a syntax element corresponding to chroma joint information, and represent whether a chroma sample is encoded to represent a residual sample of a Cb component and a residual sample of a Cr component, corresponding to the residual sample of the Cb component, in a current transform block.

The video decoding device 1700 may obtain sps_joint_cbcr_enabled_flag from a sequence parameter set before decoding the transform unit syntax 2300. When sps_joint_cbcr_enabled_flag is 1, it means that a chroma joint method in which a chroma sample is encoded to represent a residual sample of a Cb component and a residual sample of a Cr component, corresponding to the residual sample of the Cb component is allowed in a block included in a current sequence.

Accordingly, when the chroma joint method is allowed (sps_joint_cbcr_enabled_flag &&) in the current sequence through sps_joint_cbcr_enabled_flag, a prediction type of a coding unit including a current transform block is the intra prediction type ((CuPredMode[chType] [x0] [y0]==MODE_INTRA) &&), and Cr CBF information or Cb CBF information is 1 (tu_cbf_cb[xC][yC] | | tu_cbf_cr[xC][yC]), the video decoding device 1700 may first obtain tu_joint_cbcr_residual_flag, that is, chroma joint information. Also, when the prediction type of the coding unit including the current transform block is the inter prediction type, the video decoding device 1700 may obtain tu_joint_cbcr_residual_flag, that is, chroma joint information only in the case in which both Cr CBF information and Cb CBF information are 1 (tu_cbf_cb[xC][yC] && tu_cbf_cr[xC][yC]).

Accordingly, when the prediction type of the coding unit is the intra prediction type, a Cr component of which a transform coefficient level is 1 exists in the current block, or a Cb component of which a transform coefficient level is 1 exists in the current block, whether a chroma sample is encoded to represent a residual sample of a Cb component and a residual sample of a Cr component, corresponding to the residual sample of the Cb component, may be determined through chroma joint information. Accordingly, when the prediction type of the coding unit is the inter prediction type, a Cr component of which a transform coefficient level is 1 exists in a current block, and a Cb component of which a transform coefficient level is 1 exists in the current block, whether a chroma sample is encoded to represent a residual sample of a Cb component and a residual sample of a Cr component, corresponding to the residual sample of the Cb component, may be determined through chroma joint information. When the obtained chroma joint information represents 0, it means that a residual sample of a Cb component and a residual sample of a Cr component, corresponding to the residual sample of the Cb component, need to be obtained individually from a bitstream. Meanwhile, when the chroma joint information represents 1, it means that a chroma sample is obtained from a bitstream, and a residual sample of a Cb component and a residual sample of a Cr component, corresponding to the residual sample of the Cb component, are reconstructed from the chroma sample.

FIG. 24 represents relationships between Cb components, Cr components, and chroma coding components with respect to Cb CBF values and Cr CBF, according to an embodiment As described above with reference to FIG. 23, after Cb CBF information tu_cbf_cb and Cr CBF information tu_cbf_cr are obtained, weights for determining a reconstructed value resCb of a residual sample of a Cb component and a reconstructed value resCr of a residual sample of a Cr component may be determined according to the Cb CBF information and the Cr CBF information.

For example, when tu_cbf_cb is 1 and tu_cbf_cr is 0, a reconstructed value resCb of a residual sample of a Cb component may be determined to be the same value as a chroma joint residual sample resJointC, and a reconstructed value resCr of a residual sample of a Cr component may be determined to be a value obtained by multiplying the chroma joint residual sample resJointC by ±½. a signed of the reconstructed value resCr of a residual sample of a Cr component may be determined based on a value of CSign, which may be a sign value that is signaled in a bitstream. In this case, because a weight of the Cb component is 1 and a weight of the Cr component is ±½, a joint mode index may be 1.

For example, when tu_cbf_cb is 1 and tu_cbf_cr is 1, a reconstructed value resCb of a residual sample of a Cb component may be determined to be the same value as the chroma joint residual sample resJointC, and a reconstructed value resCr of a residual sample of a Cr component may be determined to be a value obtained by multiplying the chroma joint residual sample restJointC by ±1. In this case, because a weight of the Cb component is 1 and a weight of the Cr component is ±1, a joint mode index may be 2.

For example, when tu_cbf_cb is 0 and tu_cbf_cr is 1, a reconstructed value resCb of a residual sample of a Cb component may be determined to be a value obtained by multiplying the chroma joint residual sample restJointC by ±½, and a reconstructed value resCr of a residual sample of a Cr component may be determined to be the same value as the chroma joint residual sample resJointC. In this case, because a weight of the Cb component is ±½ and a weight of the Cr component is 1, a joint mode index may be 3.

When the prediction type of the coding unit is the intra prediction mode, all of the joint mode indexes 1, 2, and 3 may be possible. That is, when the prediction type of the coding unit is the intra prediction mode, a weight of a Cb component and a weight of a Cr component may be determined individually according to a joint mode index.

However, when the prediction type of the coding unit is the inter prediction mode, only the joint mode index 2 may be allowed. Accordingly, when the prediction type of the coding unit is the inter prediction mode, the chroma joint method may be allowed only in the case in which the joint mode index is 2, that is, in the case in which tu_cbf_cb is 1 and tu_cbf_cr is 1, wherein a weight of a Cb component may be determined to be 1 and a weight of a Cr component may be determined to be ±1.

Embodiments discussed above may relate to a method in which the video encoding device 1900 encodes a chroma joint residual sample instead of an actual value of a residual sample of a Cb component and an actual value of a residual sample of a Cr component, and the video decoding device 1700 obtains the chroma joint residual sample from a bitstream to determine a reconstructed value of the residual sample of the Cb component and a reconstructed value of the residual sample of the Cr component from the chroma joint residual sample.

By encoding a residual sample of a Cb component and a residual sample of a Cr component as a joint residual sample, a bit rate may be saved compared with encoding the residual sample of the Cb component and the residual sample of the Cr component individually. According to a relationship that is used by the video encoding device 1900 to determine a chroma joint residual sample by combining an actual value of a residual sample of a Cb component with an actual value of a residual sample of a Cr component and whether the video decoding device 1700 reconstructs the residual sample of the Cb component and the residual sample of the Cr component by using the joint residual sample, coding efficiency may further increase.

Hereinafter, as modifications of some embodiments discussed above, various embodiments in which the video encoding device 1900 encodes a chroma joint sample value instead of an actual value of a residual sample of a Cb component and an actual value of a residual sample of a Cr component, and the video decoding device 1700 determines a reconstructed value of the residual sample of the Cb component and a reconstructed value of the residual sample of the Cr component by using the chroma joint sample value obtained from a bitstream will be proposed.

First, a location at which chroma joint information is obtained may change variously.

In the embodiment according to FIG. 23, luma CBF information, cb CBF information, and Cr CBF information may be obtained from a bitstream, and then, chroma joint information may be obtained from the bitstream according to the Cb CBF information and the Cr CBF information.

According to another embodiment, luma CBF information and Cb CBF information may be first obtained. Then, when the Cb CBF information is 1, chroma joint information may be obtained, and when the Cb CBF information is 0 and the chroma joint information is 0, Cr CBF information may be obtained. In this case, the Cb CBF information may be decoded to a binary string configured with one bin, the chroma joint information may be decoded to a binary string configured with two bins, and the Cr CBF information may be decoded to a binary string configured with two or three bins.

According to another embodiment, to reduce the number of times joint chroma information is encoded, the joint chroma information may be decoded earlier than the Cb CBF information. More specifically, luma CBF and chroma joint information may be obtained, and when the chroma joint information is 1, a Cb CBF information value may be determined to be 1, and a Cr CBF information value may be determined to be 0. However, when the chroma joint information is 0, Cb CBF information and Cr CBF information may be obtained individually from the bitstream. In this case, the chroma joint information may be decoded to a binary string configured with one bin, the Cb CBF information may be decoded to a binary string configured with one or two bins, and the Cr CBF information may be decoded to a binary string configured with one or two bins.

Hereinafter, a context modeling method of chroma joint information will be described.

To obtain chroma joint information according to an embodiment, entropy decoding may be performed based on a CABAC decoding method. In this case, a context index may be determined to decode the chroma joint information.

For example, a context index for decoding chroma joint information may be determined based on whether a prediction type of a coding unit including a block is the intra prediction mode or the inter prediction mode.

As another example, a context index for decoding chroma joint information may be determined based on a size of a block. As a detailed example, when a width of a block is W and a height of the block is H, log 2W may be a value obtained by applying log 2 to W and log 2H may be a value obtained by applying log 2 to H. The context index may be determined based on a smaller one of log 2W and log 2H. As another example, the context index may be determined based on a greater one of log 2W and log 2H. As another example, the context index may be determined based on an average value of log 2W and log 2H. As another example, the context index may be determined based on a sum of log 2W and log 2H.

As another example, a context index for decoding chroma joint information may be determined based on a ratio of a height and width of a block.

As another example, a context index for decoding chroma joint information may be determined based on whether an inter prediction direction of a block is a uni-directional prediction type or a bi-directional prediction type.

As another example, a context index for decoding chroma joint information of the current block may be determined based on chroma joint information of a neighboring block.

As another example, a context index for decoding chroma joint information of a current block may be determined based on coding information of a neighboring block. As a detailed example, a context index for decoding chroma joint information of a current block may be determined based on CBF information of a neighboring block. As another example, a context index for decoding chroma joint information of a current block may be determined based on whether a prediction type of a neighboring block is the intra prediction mode or the inter prediction mode. As another example, a context index for decoding chroma joint information of a current block may be determined based on a transform type of a neighboring block.

As another example, a context index for decoding chroma joint information of a current block may be determined based on a transform type of the current block. For example, a context index may be determined based on whether a transform type of a current block is a transform skip type, a sub block transform type, a secondary transform type, or a transform type according to a block shape.

As another example, a context index for decoding chroma joint information of a current block may be determined based on a predefined coding mode. As a detailed example, a context index may be determined based on which one of a MHintra mode, a TriangleIntra mode, an Affine mode, an Intra BC (IBC) mode, a Symmetric motion vector difference (SMVD) mode, a Merge with motion vector difference (MMVD) mode, a Decoder-side Motion Vector Refinement (DMVD) mode, a Cross-component Linear Model (CCLM) mode, a Position dependent (intra) prediction combination (PDPC) mode, a Multi Reference Line intra prediction (MultiRefIntra) mode, an intraSubPartition mode, an inloop reshaper mode, an Overlapped Block Motion Compensation (OBMC) mode, a transformSkip mode, and a Sub-block transform (SBT) mode a coding mode of a current block is.

As another example, a context index for decoding chroma joint information of a current block may be determined based on a multiple transform selection (MTS) index of the current block.

As another example, a context index for decoding chroma joint information of a current block may be determined based on a combination of two or more conditions of various conditions proposed above.

Hereinafter, various embodiments about conditions under which a chroma joint method of encoding a chroma sample to represent a residual sample of a Cb component and a residual sample of a Cr component, corresponding to the residual sample of the Cb component, in a block is applicable will be described.

When a prediction type of a coding unit is the intra prediction mode or the inter prediction mode, the video decoding device 1700 according to an embodiment may determine whether to apply the chroma joint method, without any limitation on a block size.

As another example, whether to apply the chroma joint method may be determined based on a size of a block. As a detailed example, when a width of a block is W and a height of the block is H, log 2W may be a value obtained by applying log 2 to W and log 2H may be a value obtained by applying log 2 to H. Whether to apply the chroma joint method may be determined based on a smaller one of log 2W and log 2H. As another example, whether to apply the chroma joint method may be determined based on a greater one of log 2W and log 2H. As another example, whether to apply the chroma joint method may be determined based on an average value of log 2W and log 2H. As another example, whether to apply the chroma joint method may be determined based on a sum of log 2W and log 2H.

As another example, whether to apply the chroma joint method may be determined based on a shape of a block.

As another example, in a case of a block of the inter prediction mode, whether to apply the chroma joint method may be determined based on whether a prediction direction is a uni-directional prediction type or a bi-directional prediction type.

As another example, whether to apply the chroma joint method may be determined based on a ratio of a height and width of a block.

As another example, whether to apply the chroma joint method may be determined based on a transform type of a current block. For example, whether to apply the chroma joint method may be determined based on whether a transform type of a current block is a transform skip type, a sub block transform type, a secondary transform type, or a transform type according to a block shape.

As another example, whether to apply the chroma joint method may be determined based on the number of transform coefficients of a Cb component or the number of transform coefficients of a Cr component.

As another example, whether to apply the chroma joint method may be determined based on a predefined coding mode. As a detailed example, whether to apply the chroma joint method may be determined based on which one of a MHintra mode, a TriangleIntra mode, an Affine mode, an Intra BC (IBC) mode, a Symmetric motion vector difference (SMVD) mode, a Merge with motion vector difference (MMVD) mode, a Decoder-side Motion Vector Refinement (DMVD) mode, a Cross-component Linear Model (CCLM) mode, a Position dependent (intra) prediction combination (PDPC) mode, a Multi Reference Line intra prediction (MultiRefIntra) mode, an intraSubPartition mode, an inloop reshaper mode, an Overlapped Block Motion Compensation (OBMC) mode, a transformSkip mode, and a Sub-block transform (SBT) mode a coding mode of a current block is.

As another example, whether to apply the chroma joint method may be determined in a slice level. Applying the chroma joint method to blocks included in a current slice may be allowed according to a flag obtained from a slice header.

As another example, whether to apply the chroma joint method may be determined in a temporal layer level.

As another example, whether to apply the chroma joint method may be determined based on whether a current slice is a referenceable slice or a non-referenceable slice.

As another example, information representing whether to apply the chroma joint method may be obtained for each sub block of a current block. Accordingly, whether to apply the chroma joint method may be determined for each sub block of a transform block.

As another example, whether to apply the chroma joint method may be determined based on a combination of two or more conditions of the above-described conditions.

Detailed conditional sentences for expressing the above-described various conditions for determining whether to apply the chroma joint method may be as follows.

If intraTU only
If interTU only||inter_slice only
If    intraTU    &&    size>threshold||interTU    && size>threshold
If    intraTU    &&    size<threshold||interTU    && size<threshold
If tu_width !=tu_height
If tu_width==tu_height
If ratio(tu_width, tu_height)>threshold
If interTU && predType==UniPred
If !(interTU && predType==BiPred)
If TU is not transform skip mode
If TU is transform skip mode
If no secondary transform is applied
If no SBT is applied
If SBT is applied
If number of coeff. of Cb<threshold
If number of coeff. of Cb>threshold
If number of coeff. of Y<threshold
If number of coeff. of Y>threshold
If CBF(cb)==0 & CBF(cr)==1||CBF(cb)==1 & CBF (cr)==0

Hereinafter, a method of determining a chroma joint residual sample in the video encoding device 1900, and a process of reconstructing a residual sample of a Cb component and a residual sample of a Cr component by using a chroma joint residual sample in the video decoding device 1700, according to another embodiment, will be described.

The video encoding device 1900 according to another embodiment may determine a chroma joint residual sample resJoint by using an actual value resCb of a residual sample of a Cb component and an actual value resCr of a residual sample of a Cr component, as follows.

$$resJoint = (resCb * 3 - resCr)/4$$

$$resJoint = (resCb - resCr * 3)/4$$

The video encoding device 1900 may encode a value having a lower RD cost among the two values resJoint, as a chroma joint residual sample.

The video decoding device 1700 according to another embodiment may determine a method of reconstructing a residual sample of a Cr component, based on a reconstructed value of a sample of a luma component or a reconstructed value of a sample of a Cb component.

As another example, the video decoding device 1700 may determine a method of reconstructing a residual sample of a Cr component, based on a reconstructed value of a residual sample of a luma component or a reconstructed value of a residual sample of a Cb component.

As another example, the video decoding device 1700 may determine a method of reconstructing a residual sample of a Cr component, based on detail information of a luma component or detail information of a Cb component. For example, detail information may include at least one of a magnitude, an average, dispersion, a gradient, a high-frequency component, and a low-frequency component of a luma component or a Cb component.

As another example, the video decoding device 1700 may determine a method of reconstructing a residual sample of a Cr component, based on a content characteristic of each sub block, for each sub block of a current block. For example, content of each sub block may be a reconstructed value of a sample of a luma component or a Cb component of the corresponding sub block, or a reconstructed value of a residual sample of the luma component or the Cb component. The content characteristic of each sub block may include at least one of a magnitude, an average, dispersion, a gradient, a high-frequency component, and a low-frequency component of the corresponding sub block.

As another example, the video encoding device 1900 may encode a chroma joint residual sample and a difference of the chroma joint residual sample. The difference of the chroma joint residual sample may represent a difference between the chroma joint residual sample and a residual sample of a Cr component. The video encoding device 1900 may encode a flag representing whether a residual sample of a Cr component is encoded. In this case, the video decoding device 1700 may obtain the flag from a bitstream, and when it is determined that the residual sample of the Cr component is not encoded through the flag, the video decoding device 1700 may obtain a chroma joint residual sample jointCb and a difference diff_jointCb_Cr of the chroma joint residual sample jointCb from the bitstream. The video decoding device 1700 may determine a reconstructed value Cb of a residual sample of a Cb component and a reconstructed value Cr of a residual sample of a Cr component, according to the following equation. (Cb=2*jointCb+Cr, Cr=jointCb−diff_jointCb_Cr)

As another example, the video encoding device 1900 may encode an average value of a residual sample of a Cb component and a residual sample of a Cr component, and encode a ½ value of a difference between the residual sample of the Cb component and the residual sample of the Cr component. Also, the video encoding device 1900 may encode the flag representing whether the residual sample of the Cr component is encoded. In this case, the video decoding device 1700 may obtain the flag from a bitstream, and when it is determined that the residual sample of the Cr component is not encoded through the flag, the video decoding device 1700 may obtain the average value ave_CbCr and the ½ value diff_CbCr of the difference diff_jointCb_Cr from the bitstream. The video decoding device 1700 may determine a reconstructed value Cb of a residual sample of a Cb component and a reconstructed value Cr of a residual sample of a Cr component, according to the following equation. (Cb=ave_CbCr+diff_CbCr, Cr=ave_CbCr-diff_CbCr) In this case, a value ave_CbCr may be identical to Cb and −Cr, and a combination of a weight of a Cb component and a weight of a Cr component is not limited to (1, 1)(1, −1).

As another example, the video encoding device 1900 may encode a chroma joint residual sample having the same value as the residual sample of the Cb component. Also, the video encoding device 1900 may encode a chroma joint weight index. In this case, the video decoding device 1700 may obtain the chroma joint residual sample from a bitstream, and reconstruct a residual sample of a Cb component having the same value as the chroma joint residual sample. Also, the video decoding device 1700 may obtain a chroma joint weight index from the bitstream, and obtain a chroma joint weight indicated by the weight index from a weight table. The video decoding device 1700 may determine a value generated by multiplying the chroma joint weight by the chroma joint residual sample, to be a reconstructed value of a residual sample of a Cr component. In this case, the weight table may include $\{-1, 1, -2, -\frac{1}{2}, -4, \frac{1}{4} \ldots\}$, and each chroma joint weight index increasing from 0 may indicate a weight in the weight table. That is, when a chroma joint weight index obtained from a bitstream is 0, a value obtained by multiplying a chroma joint residual sample by −1 may be determined to be a reconstructed value of a residual sample of a Cr component.

As another example, the video encoding device 1900 may encode a chroma joint residual sample having the same value as the residual sample of the Cr component. Also, the video encoding device 1900 may encode the chroma joint weight index. In this case, the video decoding device 1700 may obtain the chroma joint residual sample from the bitstream, and reconstruct a residual sample of a Cr component having the same value as the chroma joint residual sample. Also, the video decoding device 1700 may obtain the chroma joint weight index from the bitstream, and obtain a chroma joint weight indicated by the weight index from the weight table. The video decoding device 1700 may determine a value generated by multiplying the chroma joint weight by the chroma joint residual sample, to be a reconstructed value of a residual sample of a Cb component. In this case, the weight table may include $\{-1, 1, -2, -4 \ldots\}$, and each chroma joint weight index increasing from 0 may indicate a weight in the weight table. That is, when a chroma joint weight index obtained from a bitstream is 0, a value obtained by multiplying a chroma joint residual sample by −1 may be determined to be a reconstructed value of a residual sample of a Cb component. Generally, because a sample of a Cr component may be smaller than a sample of a Cb component, an absolute value of a chroma joint weight included in the weight table may be greater than or equal to 1.

In the above-described embodiment, a method of encoding and decoding a chroma residual sample in a spatial domain has been described. Hereinafter, a method of encoding and decoding a chroma transform coefficient in a transform domain will be described. Transform coefficients of a Cr component may be encoded and decoded by using some of transform coefficients of a Cb component.

The video encoding device 1900 according to an embodiment may encode transform coefficients of a Cb component, without encoding transform coefficients of a Cr component. The video decoding device 1700 may decode transform coefficients of a Cb component obtained from a bitstream to determine reconstructed values of the transform coefficients of the Cb component. The video decoding device 1700 may reconstruct a transform coefficient of a Cr component by using a low-frequency component of a transform coefficient of a Cb component. As another example, a value obtained by multiplying a transform coefficient of a Cb component by a preset weight may be determined to be a reconstructed value of a transform coefficient of a Cr component.

The video encoding device 1900 according to another embodiment may encode a transform coefficient of a Cb component and a residual component of the Cb component, without encoding a transform coefficient and a residual component of a Cr component and Cr CBF information. The video decoding device 1700 may decode transform coefficients of a Cb component obtained from a bitstream to determine reconstructed values of the transform coefficients of the Cb component. The video decoding device 1700 may reconstruct a transform coefficient of a Cr component by using a low-frequency component of a transform coefficient of a Cb component. As another example, a value obtained by multiplying a transform coefficient of a Cb component by a preset weight may be determined to be a reconstructed value of a transform coefficient of a Cr component.

Hereinafter, various embodiments for determining a quantization parameter for a chroma component by using a delta quantization parameter dQP for a Cb component, when a chroma joint method for a preset joint mode can be performed, will be described.

According to an embodiment, the video decoding device 1900 may determine a value obtained by subtracting dQP from a chroma joint quantization parameter for a Cb component QPcb, to be a chroma joint quantization parameter QPjoint, when dQP is 2. For example, when a joint mode index is 1, the video decoding device 1900 may perform dequantization on a transform coefficient of a Cb component and a transform coefficient of a Cr component by using a chroma joint quantization parameter QPjoint.

As another example, dQP for a chroma component may be obtained through transform block syntax. Accordingly, the video decoding device 1900 may determine dQP of a Cb component and a Cr component included in a current transform unit by obtaining dQP for a chroma component for each transform unit.

As another example, dQP for a chroma component may be obtained through prediction block syntax. Accordingly, the video decoding device 1900 may determine dQP of a Cb component and a Cr component included in a current prediction unit by obtaining dQP for a chroma component for each prediction unit.

As another example, dQP for a chroma component may be obtained through coding block syntax. Accordingly, the video decoding device 1900 may determine dQP of a Cb component and a Cr component included in a current coding unit by obtaining dQP for a chroma component for each coding unit.

As another example, dQP for a chroma component may be obtained through maximum coding block syntax. Accordingly, the video decoding device 1900 may determine dQP of a Cb component and a Cr component included in a current largest coding unit by obtaining dQP for a chroma component for each largest coding unit.

As another example, dQP for a chroma component may be obtained through slice header syntax. Accordingly, the video decoding device 1900 may determine dQP of a Cb component and a Cr component included in a current slice by obtaining dQP for a chroma component for each slice.

As another example, dQP for a chroma component may be obtained for each temporal layer. Accordingly, the video decoding device 1900 may determine dQP of a Cb component and a Cr component included in a current temporal layer.

For example, dQP for the chroma component may be a difference value between QP for a Cb component and QP for a luma component. As another example, QP for the chroma component may be a difference value between QP for a chroma component and default QP.

As another example, the video decoding device 1700 may determine dQP for a chroma component based on a prediction type of a coding unit. For example, when a prediction type of a coding unit is an intra prediction mode, dQP for a chroma component may be determined to be 2, and, when the prediction type of the coding unit is not the intra prediction mode, dQP for a chroma component may be determined to be 1.

As another example, the video decoding device 1700 may determine dQP for a chroma component based on a block size. For example, when a block size is larger than or equal to 16×16, dQP for a chroma component may be determined to be 1, and when a block size is smaller than 16×16, dQP for a chroma component may be determined to be 2.

As another example, the video decoding device 1700 may determine dQP for a chroma component based on a preset coding mode of a block. As a detailed example, a coding mode of a current block may be at least one of a MHintra mode, a TriangleIntra mode, an Affine mode, an Intra BC (IBC) mode, a Symmetric motion vector difference (SMVD) mode, a Merge with motion vector difference (MMVD) mode, a Decoder-side Motion Vector Refinement (DMVD) mode, a Cross-component Linear Model (CCLM) mode, a Position dependent (intra) prediction combination (PDPC) mode, a Multi Reference Line intra prediction (MultiRefIntra) mode, an intraSubPartition mode, an inloop reshaper mode, an Overlapped Block Motion Compensation (OBMC) mode, a transformSkip mode, and a Sub-block transform (SBT) mode. For example, when an index of a preset coding mode of a current block is 1, dQP for a chroma component may be determined to be 1, and, when the index is not 1, dQP for a chroma component may be determined to be 2.

As another example, the video decoding device 1700 may determine dQP for a chroma component based on identification information of a current temporal layer. For example, when identification information of a temporal layer including a current block is greater than 2, dQP for a chroma component may be determined to be 0, and when the identification information is smaller than or equal to 2, dQP for a chroma component may be determined to be 2. As another example, when identification information of a temporal layer including a current block is 0, dQP for a chroma component may be determined to be 2, and when the identification information is not 0 and smaller than 3, dQP for a chroma component may be determined to be 1. When the identification information is greater than or equal to 3, dQP for a chroma component may be determined to be 0.

As another example, the video decoding device 1700 may determine dQP for a chroma component of a current block based on a quantization parameter of a neighboring block or a quantization parameter difference value of the neighboring block.

Hereinafter, an embodiment for a method for selecting a case of using a plurality of joint modes and a case of using a joint mode in a chroma joint method according to a preset condition will be described.

The video encoding device 1900 may encode a chroma joint residual sample C, or encode a first chroma joint residual sample C1 and a second chroma joint residual sample C2, according to a chroma joint mode. In a first mode and a third mode, the chroma joint residual sample C may be determined and encoded. The video encoding device 1900 may assume a value obtained by multiplying an actual value of a residual sample of a Cb component by −1, as a residual sample of a Cr component, determine the same value as the residual sample of the Cb component to be the chroma joint residual sample C, and encode the chroma joint residual sample C. In a second mode, the first chroma joint residual sample C1 may be determined to be an average value of an actual value of a residual sample of a Cb component and an actual value of a residual sample of a Cr component (that is, $c1=(cb+cr)/2$). The second chroma joint residual sample C2 may be determined to be an average value of an actual value of a residual sample of a Cb component and a negative value of an actual value of a residual sample of a Cr component (that is, $c2=(cb-cr)/2$).

For example, the video decoding device 1700 may enable two chroma joint modes. In a first mode, a residual sample of a Cb component may be reconstructed to the same value as a chroma joint residual sample, and a residual sample of a Cr component may be reconstructed to a value obtained by multiplying the chroma joint residual sample by −1 (cb=c, cr=−c). In a second mode, a residual sample of a Cb component may be reconstructed to a value obtained by summing a first chroma joint residual sample and a second chroma joint residual sample, and a residual sample of a Cr component may be reconstructed to a value obtained by subtracting the second chroma joint residual sample from the first chroma joint residual sample (cb=c1+c2, cr=c1−c2). When a prediction type of a coding unit is an intra prediction mode, the video decoding device 1700 may obtain a chroma joint mode index from a bitstream, and reconstruct a residual sample of a Cb component and a residual sample of a Cr component according to a method indicated by the mode index among the first mode and the second mode as a chroma joint method. When the prediction type of the coding unit is an inter prediction mode, the video decoding device 1700 may reconstruct a residual sample of a Cb component and a residual sample of a Cr component according to the second mode, without a mode index.

As another example, the video decoding device 1700 may enable three chroma joint modes. In a first mode, a residual sample of a Cb component may be reconstructed to the same value as a chroma joint residual sample, and a residual sample of a Cr component may be reconstructed to a value obtained by multiplying the chroma joint residual sample by −1 (for example, cb=c, cr=−c). In a second mode, a residual sample of a Cb component may be reconstructed to a value obtained by summing a first chroma joint residual sample and a second chroma joint residual sample, and a residual sample of a Cr component may be reconstructed to a value obtained by subtracting the second chroma joint residual sample from the first chroma joint residual sample (for example, cb=c1+c2, cr=c1−c2). In a third mode, a residual sample of a Cb component may be reconstructed to the same value as a chroma joint residual sample, and a residual sample of a Cr component may be reconstructed to a value obtained by multiplying the chroma joint residual sample by −½ (for example, cb=c, cr=−½c). When a prediction type of a coding unit is the intra prediction mode and an intra prediction direction is a plana mode or a DC mode, the video decoding device 1700 may reconstruct a residual sample of a Cb component and a residual sample of a Cr component according to a first mode, without having to obtain a mode index. When a prediction type of a coding unit is the intra prediction mode and an intra prediction direction is a directional mode, the video decoding device 1700 may obtain a chroma joint mode index from a bitstream, and reconstruct a residual sample of a Cb component and a residual sample of a Cr component, according to a method indicated by the mode index among the first mode and the third mode. When a prediction type of a coding unit is the inter prediction mode, the video decoding device 1700 may reconstruct a residual sample of a Cb component and a residual sample of a Cr component according to the second mode, without having to obtain a mode index.

Hereinafter, an embodiment for a case of using a plurality of joint modes according to a preset condition in a chroma joint method will be described.

The above embodiment in which the video encoding device 1900 can encode a chroma joint residual sample C or encode a first chroma joint residual sample C1 and a second chroma joint residual sample C2 according to the first, second, and third modes may be applied in the same way to the current embodiment. The above embodiment in which the video decoding device 1700 reconstructs a residual sample of a Cb component and a residual sample of a Cr component by using at least one of a chroma joint residual sample C, a first chroma joint residual sample C1, and a second chroma joint residual sample C2 in three chroma joint modes may also be applied in the same way to the current embodiment.

When a prediction type of a coding unit is the intra prediction mode, the video decoding device 1700 may obtain a chroma joint mode index from a bitstream, and reconstruct a residual sample of a Cb component and a residual sample of a Cr component according to a method indicated by the mode index among the first mode and the second mode. When a prediction type of a coding unit is the inter prediction mode, the video decoding device 1700 may obtain a chroma joint mode index from a bitstream, and reconstruct a residual sample of a Cb component and a residual sample of a Cr component according to a method indicated by the mode index among the first mode and the third mode.

Hereinafter, an embodiment for a case of using a plurality of joint modes in a preset condition without a chroma joint mode index in a chroma joint method will be described.

The above-described embodiment in which the video encoding device 1900 encodes a chroma joint residual sample C or encodes a first chroma joint residual sample C1 and a second chroma joint residual sample C2 according to the first, second, and third modes may be applied in the same way to the current embodiment. The above-described embodiment in which the video decoding device 1700 reconstructs a residual sample of a Cb component and a residual sample of a Cr component by using at least one of a chroma joint residual sample C, a first chroma joint residual sample C1, and a second chroma joint residual sample C2 in three chroma joint modes may also be applied in the same way to the current embodiment. When a prediction type of a coding unit is the intra prediction mode and an intra prediction direction is a planar mode or a DC mode, the video decoding device 1700 may reconstruct a residual sample of a Cb component and a residual sample of a Cr component according to the first mode, without having to obtain a mode index. When a prediction type of a coding unit is the intra prediction mode and an intra prediction direction is a directional mode, the video decoding device 1700 may reconstruct a residual sample of a Cb component and a residual sample of a Cr component according to the second mode, without having to obtain a mode index. When a prediction type of a coding unit is the inter prediction mode, the video decoding device 1700 may reconstruct a residual sample of a Cb component and a residual sample of a Cr component according to the third mode, without having to obtain a mode index.

A relationship for reconstructing a residual sample of a Cb component and a residual sample of a Cr component by using at least one of a first chroma joint residual sample C1 and a second chroma joint residual sample C2 is not limited to the above-described embodiments, and various relations may be applied. For example, various relationships, such as cb=w1*c1+w2*c2 and cr=w3*c1+w4*c2, may be used by modifying weights w1, w2, w3, and w4.

Also, various embodiments related to a condition for selecting one mode from among a plurality of joint modes without a chroma joint mode index in the above-described embodiment will be described below.

For example, one mode among the plurality of joint modes may be determined based on whether a prediction type of a coding unit including a block is the intra prediction mode or the inter prediction mode.

As another example, one mode among the plurality of joint modes may be determined based on a size of a block. As a detailed example, when a width of a block is W and a height of the block is H, log 2W may be a value obtained by applying log 2 to W and log 2H may be a value obtained by applying log 2 to H. One mode among the plurality of joint modes may be determined based on a smaller one of log 2W and log 2H. As another example, one mode among the plurality of joint modes may be determined based on a greater one of log 2W and log 2H. As another example, one mode among the plurality of joint modes may be determined based on an average value of log 2W and log 2H. As another example, one mode among the plurality of joint modes may be determined based on a sum of log 2W and log 2H.

As another example, one mode among the plurality of joint modes may be determined based on a ratio of a height and width of a block.

As another example, one mode among the plurality of joint modes may be determined based on whether an inter prediction direction of a block is a uni-directional prediction type or a bi-directional prediction type.

As another example, one mode among the plurality of joint modes for a current block may be determined based on chroma joint information of a neighboring block.

As another example, one mode among the plurality of joint modes for a current block may be determined based on coding information of a neighboring block. As a detailed example, one mode for a current block among the plurality of joint modes may be determined based on CBF information of a neighboring block. As another example, a mode for a current block among the plurality of joint modes may be determined based on whether a prediction type of a neighboring block is the intra prediction mode or the inter prediction mode. As another example, a mode for a current block among the plurality of joint modes may be determined based on a transform type of a neighboring block. As another example, one mode among the plurality of joint modes may be determined based on a transform type of a current block. For example, one mode among the plurality of joints modes may be determined based on whether a transform type of a current block is a transform skip type, a sub block transform type, a secondary transform type, or a transform type according to a block shape.

As another example, one mode among the plurality of joint modes may be determined based on a predefined coding mode. As a detailed example, one mode among the plurality of joint modes may be determined based on which one of a MHintra mode, a TriangleIntra mode, an Affine mode, an Intra BC (IBC) mode, a Symmetric motion vector difference (SMVD) mode, a Merge with motion vector difference (MMVD) mode, a Decoder-side Motion Vector Refinement (DMVD) mode, a Cross-component Linear Model (CCLM) mode, a Position dependent (intra) prediction combination (PDPC) mode, a Multi Reference Line intra prediction (MultiRefIntra) mode, an intraSubPartition mode, an inloop reshaper mode, an Overlapped Block Motion Compensation (OBMC) mode, a transformSkip mode, and a Sub-block transform (SBT) mode a coding mode of a current block is.

As another example, one mode for a current block among the plurality of joint modes may be determined based on a multiple transform selection (MTS) index of the current block.

As another example, one mode to be used in blocks included in a current slice among the plurality of joint modes may be determined for each slice.

As another example, one mode to be used in blocks included in a current temporal layer among the plurality of joint modes may be determined in a temporal layer level.

As another example, one mode among the plurality of joint modes may be determined based on whether a current slice is a referenceable slice or a non-referenceable slice.

As another example, one mode among the plurality of joint modes may be determined based on the number of transform coefficients of a Cb component and the number of transform coefficients of a Cr component.

As another example, in the case of a block of the inter prediction mode, one mode among the plurality of joint modes may be determined based on whether a prediction direction is a unidirectional prediction type or a bidirectional prediction type.

As another example, one mode among the plurality of joint modes may be determined based on Cb CBF information and Cr CBF information of a current block.

As another example, one mode among the plurality of joint modes may be determined based on a combination of two or more conditions among various conditions proposed above.

Embodiments of the disclosure as described above may be written as a program that is executable on a computer, and the written program may be stored in a medium.

The medium may continuously store the computer-executable program, or temporarily store the computer-executable program for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Various embodiments of the disclosure have been described in detail above with reference to the figures. However, the technical ideas of the disclosure are not limited to these embodiments, and various modifications and changes are possible by one of ordinary skill in the art within the scope of the technical ideas of the disclosure.

The invention claimed is:

1. A video decoding method comprising:
when a prediction type of a current block is intra prediction mode, extracting chroma joint information based on one of a value of coded block flag (CBF) information for a Cr component and a value of CBF information for a Cb component being 1, wherein the chroma joint information indicates whether a chroma residual sample of a single block is encoded to represent a residual sample of the Cb component and a residual sample of the Cr component in the current block;
when the prediction type of the current block is an inter prediction mode, obtaining the chroma joint information from a bitstream, based on the value of the CBF information for the Cr component being 1 and the value of the CBF information for the Cb component being 1;
when the chroma joint information indicates that the chroma residual sample of the single block is encoded to represent the residual sample of the Cb component and the residual sample of the Cr component in the current block, determining a weight of the residual sample of the Cr component,
obtaining, from the bitstream, a chroma residual sample of the current block; and
reconstructing the residual sample of the Cr component by using the chroma residual sample of the current block and the weight of the residual sample of the Cr component.

2. A video encoding method comprising:
when a prediction type of a current block is intra prediction mode, determining, based on one of a value of coded block flag (CBF) information for a Cr component and a value of CBF information for a Cb component being 1, whether a chroma residual sample of a single block is encoded to represent a residual sample of the Cb component and a residual sample of the Cr component in the current block;
when the chroma residual sample of the single block is encoded to represent the residual sample of the Cb component and the residual sample of the Cr component in the current block, determining a weight of the residual sample of the Cr component;
obtaining a chroma residual sample of the current block by using the residual sample of the Cr component and the weight of the residual sample of the Cr component;
encoding the chroma residual sample of the current block into a bitstream; and
encoding chroma joint information into the bitstream, the chroma joint information indicating whether the chroma residual sample of the single block is encoded to represent the residual sample of the Cb component and the residual sample of the Cr component in the current block,
wherein, when the prediction type of the current block is an inter prediction mode, the chroma joint information is encoded based on the value of the CBF information for the Cr component being 1 and the value of the CBF information for the Cb component being 1.

3. A method of transmitting a bitstream, the bitstream being generated by the video encoding method of claim 2.

* * * * *